US010087397B2

(12) United States Patent
Phillips et al.

(10) Patent No.: US 10,087,397 B2
(45) Date of Patent: Oct. 2, 2018

(54) SYSTEM AND METHODS FOR MAKING BIOPRODUCTS

(71) Applicant: Flint Hills Resources, LP, Wichita, KS (US)

(72) Inventors: Matthew Wesley Phillips, Andover, KS (US); Megan Christina Fry Nitz, Ames, IA (US); Erich Charles Pfalzgraf, Oskaloosa, IA (US); Rebecca Williams, Aberdeen, MS (US); William A. Summers, Des Moines, IA (US)

(73) Assignee: FLINT HILLS RESOURCES, LP, Wichita, KS (US)

( * ) Notice: Subject to any disclaimer, the term of this patent is extended or adjusted under 35 U.S.C. 154(b) by 0 days.

(21) Appl. No.: 14/874,278

(22) Filed: Oct. 2, 2015

(65) Prior Publication Data

US 2016/0194581 A1 Jul. 7, 2016

Related U.S. Application Data

(60) Provisional application No. 62/059,819, filed on Oct. 3, 2014.

(51) Int. Cl.
| | | |
|---|---|---|
| *C11C 3/10* | (2006.01) | |
| *C11C 3/04* | (2006.01) | |
| *C11C 1/08* | (2006.01) | |
| *C11C 3/00* | (2006.01) | |

(Continued)

(52) U.S. Cl.
CPC ............. *C11C 3/04* (2013.01); *B01J 19/2445* (2013.01); *C11C 1/08* (2013.01); *C11C 1/103* (2013.01); *C11C 3/003* (2013.01); *B01J 2219/00051* (2013.01); *B01J 2219/00162* (2013.01); *B01J 2219/24* (2013.01)

(58) Field of Classification Search
CPC .......................................................... C11C 3/04
USPC ...................................................... 554/167
See application file for complete search history.

(56) References Cited

U.S. PATENT DOCUMENTS 4,049,686 A * 9/1977 Ringers ................. C11B 3/04
554/190
6,509,487 B2 * 1/2003 Tatsumi ................. C07C 67/08
554/162
(Continued)

FOREIGN PATENT DOCUMENTS

WO WO 2011023712 A1 * 3/2011 ............. C07C 69/24
WO 2016054597 4/2016

OTHER PUBLICATIONS

Lou et al., "Efficient production of biodiesel from high free fatty acid-containing waste oils using various carbohydrate-derived solid acid catalysts", Bioresource Technology, May 27, 2008, pp. 8752-8758.

(Continued)

*Primary Examiner* — Deborah D Carr

(57) ABSTRACT

Processes and system for producing biofuels and coproducts are described herein. The processes include pretreating a feedstock comprising fatty acid glycerides and free fatty acids to remove contaminants, contacting the feedstock with alcohols and a solid acidic catalyst to produce a biofuel comprising fatty acid alkyl esters, and purifying the biofuel and coproducts from the resulting reaction mixture.

19 Claims, 3 Drawing Sheets

(51) Int. Cl.
*B01J 19/24* (2006.01)
*C11C 1/10* (2006.01)

(56) References Cited

U.S. PATENT DOCUMENTS

| | | | | |
|---|---|---|---|---|
| 7,452,515 | B1 * | 11/2008 | Lafleur | B01J 4/00 |
| | | | | 422/224 |
| 8,247,585 | B2 | 8/2012 | Pendleton et al. | |
| 8,252,949 | B2 * | 8/2012 | Seki | C11C 3/003 |
| | | | | 554/132 |
| 8,314,045 | B1 * | 11/2012 | Sinoncelli | C10G 29/205 |
| | | | | 502/180 |
| 8,580,119 | B1 * | 11/2013 | Shah | C07C 67/03 |
| | | | | 210/669 |
| 2012/0232300 | A1 | 9/2012 | Summers et al. | |

OTHER PUBLICATIONS

Park et al., "Esterification of free fatty acids using water-tolerable Amberlyst as a heterogeneous catalyst", Bioresource Technology, Jan. 2010, pp. S62-S65.

PCT/US2015/053868, "International Preliminary Report on Patentability", dated Apr. 13, 2017, 10 pages.

PCT/US2015/053868, "International Search Report and Written Opinion", dated Jan. 4, 2016, 14 pages.

Yan et al., "Cellulose extraction from palm kernel cake using liquid phase oxidation", Journal of Engineering Science and Technology, 2009, pp. 57-68.

* cited by examiner

SYSTEM AND METHODS FOR MAKING BIOPRODUCTS

CROSS-REFERENCES TO RELATED APPLICATIONS

This application claims the benefit of U.S. Provisional Application No. 62/059,819, entitled "SYSTEM AND METHODS FOR MAKING BIOPRODUCTS," filed Oct. 3, 2014, the entire disclosure of which is hereby incorporated herein by reference.

BACKGROUND OF THE INVENTION

Biobased products (for example, biodiesel and/or biolubricants) typically include long chain, fatty acid alkyl esters produced from vegetable oils or animal fats by transesterification of the fatty acid glycerides with alcohols. Biodiesel typically include long chain, fatty acid alkyl esters produced from vegetable oils or animal fats by transesterification of the fatty acid glycerides with lower alcohols (for example, methanol and/or ethanol). Biolubricants may be prepared through transesterification of glycerides with alcohols having carbon numbers ranging from 5 to 12 or greater, branched alcohols of similar molecular weight, or transesterification of fatty acid methyl esters. Due to environmental concerns bio-based products in many formulations are being used as substitutes for the petroleum-based products. Biobased products derived from vegetable and plant products, such as soybean, sunflower, and rapeseed etc., are renewable, biodegradable, less environmentally hazardous, and safer to handle. Similarly, other renewable sources of fatty acid glycerides include rendered animal fats and waste cooking oils from commercial food production. Rendered animal fats and waste cooking oils may also be used in the production of biodiesel fuels and biolubricants for automobile applications, mechanical engine applications, cosmetic applications, and soaps.

Transesterification of fatty acid glycerides may be used to improve the fuel value and lubricant utility of the fatty acid glycerides. The production of useful industrial compounds from naturally-derived and sustainably-produced fatty acid glycerides is made difficult by the presence of lipophilic or oil soluble material which must be removed to permit the following transesterification to reach a high level of conversion and economic efficiency. Such problems with seed oils include degumming, the removal of phospholipids; deodorizing, the removal of free fatty acids; and bleaching, the removal of finely divided solids and colored materials. Conventional processes that use alkaline catalysts for the production of fatty acid methyl esters may be highly sensitive to the presence of contaminates in the fatty acid glyceride phase. Moisture may deactivate the alkaline catalyst. Free fatty acids present in the starting material may inactivate the alkaline catalyst and produce soaps; and unsaponifiable materials may react with such catalysts. Water and/or soaps interfere with the separation of glycerin from the fatty acid alkyl ester mixtures. Additionally, the final product may have to be blended with other oils to adjust the free fatty acid content and/or reduce the content of contaminants in the final product.

Many methods and/or catalysts for the transesterification of fatty alkyl acids have been proposed, however, many methods require purification of starting materials, removal of water from the starting fatty alkyl acid, and/or steps to remove by-products formed from the esterification reactions. The processes and systems described herein provide an efficient method of transesterifying both edible and non-edible vegetable oils in refined or unrefined forms at mild conditions. Further, the processes and systems described herein provide an efficient method of simultaneously converting free fatty acid contaminants of naturally-derived and sustainably-produced fatty acid glycerides at mild conditions. Such combined methods enable economic benefits and make the bioproducts an economical alternative to petroleum based diesel and lubricants.

BRIEF SUMMARY OF THE INVENTION

The instant application describes processes and systems for producing a renewable biofuel, such biodiesel, and other useful coproducts. In one aspect the process produces a product comprising fatty acid alkyl esters from a feedstock comprising fatty acid glycerides. In some embodiments, the feedstock also comprises fatty acids. In some embodiments, the fatty acids are free fatty acids.

Accordingly, in one embodiment, a process for making a fatty acid alkyl ester from a mixture comprising a fatty acid glyceride and a fatty acid, is provided. The mixture comprises at least one component selected from the group consisting of a gum, a suspended solid, a dissolved metal, and combinations thereof. The process further comprises a) purifying the mixture by: i) contacting the mixture with water; ii) separating the mixture to reduce the amount of at least one component from the mixture while the amount of fatty acid relative to the amount of fatty acid glyceride in the mixture is substantially the same; and iii) drying the mixture. The component can be separated from the mixture using a mechanical device such as a filter, or a centrifuge.

In another aspect, a process for making a product comprising fatty acid alkyl esters from a feedstock comprising fatty acid glycerides using two catalyst reactors is provided. Accordingly, in some embodiments, the process described herein is for making a fatty acid alkyl ester from a mixture comprising a fatty acid glyceride; the process comprising:
   a) contacting the mixture with an alcohol and a heterogeneous acid catalyst in a first reactor to produce a first reaction mixture;
   b) transferring the first reaction mixture to a second reactor, and
   c) contacting the first reaction mixture with additional alcohol and a heterogeneous acid catalyst to produce a second reaction mixture comprising a fatty acid alkyl ester, unreacted alcohol, and glycerin; wherein the acid number of the second reaction mixture is less than about 0.5, 0.4, 0.3, 0.2, or 0.1.

In another aspect, a process for reducing the amount of a coproduct in a product comprising fatty acid alkyl esters is provided. In some embodiments, the amount of one or more coproducts is reduced from a reaction mixture comprising fatty acid esters while maintaining the amount of fatty acid esters in the reaction mixture. Thus, in some embodiments, the process for making a fatty acid alkyl ester comprises: a) contacting a mixture comprising a fatty acid glyceride with an alcohol and a heterogeneous acid catalyst to produce a reaction mixture comprising a fatty acid alkyl ester, unreacted alcohol, glycerin, dimethyl ether (DME), and water; and b) reducing the amount of DME from the reaction mixture while maintaining the amount of fatty acid ester; to obtain a fatty acid alkyl ester. In some embodiments, the process further comprises i) separating the glycerin from the reaction mixture; and ii) removing the alcohol, water and DME from the mixture of (i) to obtain a fatty acid alkyl ester. In some embodiments, the DME is concentrated and used as a fuel.

In some embodiments, the process for making a fatty acid alkyl ester comprises: a) contacting a mixture comprising a fatty acid glyceride with an alcohol and a heterogeneous acid catalyst to produce a reaction mixture comprising a fatty acid alkyl ester, unreacted alcohol, glycerin, methoxypropanediol (MPD) and water; and b) reducing the amount of MPD from the mixture while maintaining the amount of fatty acid ester; to obtain a fatty acid alkyl ester. In some embodiments, the process further comprises: i) separating glycerin and MPD from the reaction mixture; and ii) washing the reaction mixture from step (i) with water to obtain a fatty acid alkyl ester.

In another aspect, systems for producing a product comprising fatty acid alkyl esters, such as a biofuel, are provided. In some embodiments, a system for making a fatty acid alkyl ester is described, the system comprising: at least two reactors for reacting a) an alcohol and b) a mixture of a fatty acid glyceride and a fatty acid; and a heterogeneous catalyst; each reactor being capable of i) receiving a controlled flow of the alcohol and the mixture, ii) controlling the temperature or pressure within the reactor; and iii) removing one or more components of the reaction mixture.

DEFINITIONS

As used herein, the term "about," when modifying any amount, refers to the variation in that amount typically encountered by one of skill in the art, i.e., in a biofuel production facility or testing lab. For example, the term "about" refers to the normal variation encountered in measurements for a given analytical technique, both within and between batches or samples. Thus, the term about can include variation of 1-10% of the measured value, such as 5% or 10% variation. The amounts disclosed herein include equivalents to those amounts, including amounts modified or not modified by the term "about."

The term "free fatty acid" refers to a carboxylic acid with a carbon chain number of 6 or greater. Free fatty acids include saturated, unsaturated, and polyunsaturated fatty acids.

The terms "suspended solids" and "insolubles" refer to solid particles that are suspended in a process stream and can be separated from the process stream under appropriate conditions.

The term "gum" refers to a phospholipid having one of the fatty acid chains substituted by a phosphatide. Examples include hydratable and non-hydratable phosphatides, lecithins, and other impurities.

The term "heterogeneous catalyst" refers to a catalyst that is in a different phase (for example, a solid catalyst described herein) to other compounds (for example, liquid or vapor) when mixed together. The catalyst may be separated easily by removal from a fixed bed reactor or separated from a mixture by centrifugation or by simple filtration and re-used.

Numerical ranges described herein include the end points of the range and all values in between. The values in between the end points are typically based on the relevant significant figure of a given value. For example, if the range is based on integer values, then the relevant significant figure is greater than or equal to one.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

BRIEF DESCRIPTION OF THE DRAWINGS

FIG. 1(A) shows a pretreatment system. FIG. 1(B) shows a reaction system. FIG. 1(C) shows a purification system.

DETAILED DESCRIPTION OF THE INVENTION

Figure 1A:
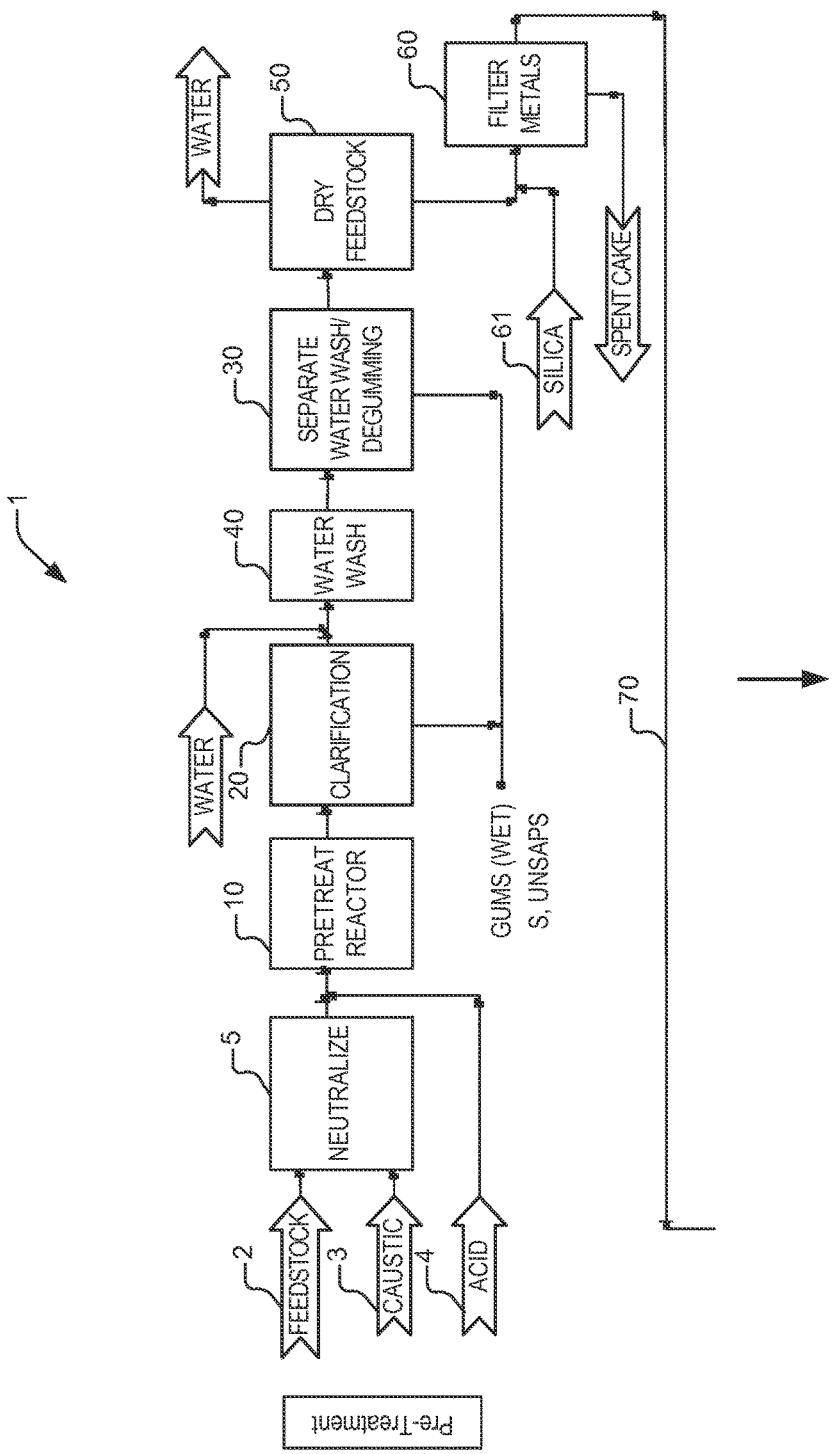
FIGS. 1A, 1B, and 1C show one embodiment of a system for producing fatty acid alkyl esters described herein.

The instant application describes processes and systems for producing a renewable biofuel, such as biomass-based diesel (biodiesel), and other useful coproducts. The process combines esterification of free fatty acids (FFAs) and transesterification of triglycerides (e.g., fatty acid triglycerides) and other bound glycerides (e. g. monoglycerides and diglycerides) to produce fatty acid alkyl esters in a single, high-efficiency, process step. The high-efficiency process step is catalyzed by a catalyst. In some embodiments, the catalyst is a heterogeneous acid catalyst. Because the catalyst can convert free fatty acids to fatty acid alkyl esters. The process described herein further comprises a pretreatment step that removes impurities from a feedstock. In some embodiments, the feedstock is an oil, for example an oil derived from plants or animals. Following the pretreatment step, the feedstock is reacted with the catalyst to produce fatty acid alkyl esters. The reaction can occur at elevated temperatures and pressures. In some embodiments, the reaction occurs in two reactors placed in series. The biodiesel and other coproducts produced by the process are then purified from the reaction mixture. The purified biodiesel and other coproducts can then be used in downstream processes or sold to generate revenue for the biodiesel facility. For example, the reaction produces the coproducts dimethyl ether (DME) and methoxypropanediol (MPD). The DME can be concentrated and used in downstream processes, for example as a supplemental fuel for heating various steps in the process. The MPD can be combined with other coproducts, for example glycerin. The process and system are described in more detail below.

Feedstock

The feedstock used in the process described herein comprises fatty acid glycerides and free fatty acids. The feedstock is typically an oil derived from plants or animals. In some embodiments, the oil is a crude or low quality oil, for example an unrefined or partially refined oil. In one embodiment, the oil is crude (i.e., non-food grade) corn oil.

Representative, non-limiting examples of feedstocks include algae oil, beef tallow, camelina oil, canola oil, corn oil, distillers corn oil e.g., extracted from dry distiller's grain (DDG), or dry distiller's grain with solubles (DDGS), palm oil, palm fatty acid distillate, poultry fat, used cooking oil, yellow grease, choice white grease, or combinations thereof.

In some embodiments, the source of fatty acid glyceride used is a vegetable oil, an animal fat, a cooking oil or grease, a waste cooking oil or grease, and mixtures thereof. In some embodiments, the vegetable oil used is selected from the group consisting of coconut oil, palm oil, sunflower oil, soybean oil, mustard oil, olive oil, cotton seed oil, rapeseed oil, margarine oil, jojoba oil, jatropha oil, karanja oil, camelina, pennycress, meadowfoam, and mixtures thereof.

In some embodiments, the feedstock (fatty acid alkyl esters) stream comprises alkyl esters of fatty acids selected from myristic, palmitic, palmitoleic, stearic, oleic, linoleic, linolenic, alpha-linolenic acid (ALA), gamma-linolenic acid (GLA), and arachidic acids and mixtures thereof.

In some embodiments, the feedstock comprises fatty acid glycerides selected from monoglycerides, diglycerides, and triglycerides. In some embodiments, the amount of triglycerides in the feedstock is from about 10% to about 100% by weight, from about 30% to about 95% by weight, or from about 50% to about 90% by weight. In some embodiments, the amount of triglycerides in the feedstock can be less than about, at least about and/or about 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99%.

In some embodiments, the amount of free fatty acids in the feedstock is from about 1% to about 100% by weight, for example, from about 5% to about 100%, from about 10% to about 90%, from about 20% to about 80%, from about 20% to about 70%, from about 20% to about 60%, from about 20% to about 50%, from about 30% to about 70%, from about 30% to about 60%, or from about 40% to about 60% by weight. In some embodiments, the amount of free fatty acids in the feedstock can be less than about, at least about and/or about 2%, 3%, 4%, 5%, 6%, 7%, 8%, 9%, 10%. 11%, 12%, 13%, 14%, 15%, 16%, 17%, 18%, 19%, 20%, 21%, 22%, 23%, 24%, 25%, 26%, 27%, 28%, 29%, 30%, 31%. 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 8'7%, 88%, 89%, 90%, 91%, 92%, 93%, 94%, 95%, 96%, 97%, 98%, 99%, or 100% by weight. The amount of free fatty acid in the feedstock can be determined using methods known in the art, for example, ASTM Test Method D1585 or D664.

The feedstock can comprise fatty acid glycerides derived from a mixture of vegetable oil and animal fat. In some embodiments, the feedstock mixture comprises at least 5%, at least 10%, at least 15%, or at least 20% animal fat.

In some embodiments, the feedstock comprises impurities. The impurities can include gums (e.g. lecithins), suspended solids, and metals. The impurities are removed by the pretreatment process described herein.

Pretreatment

The process described herein can further comprise a pretreatment step designed to remove impurities, contaminants, or other components of the feedstock stream that can damage the catalyst and/or shorten catalyst life. In some embodiments, the pretreatment step removes impurities such as suspended solids, water and gums (e.g., phosphatides) via centrifugation. In some embodiments, the impurity is selected from the group of a gum, a suspended solid, and a dissolved metal. In some embodiments, a chemical is added to the feedstock to increase the amount of impurities removed. In some embodiments, the chemical is an acid that is useful in degumming the feedstock, such as, for example, phosphoric acid, oxalic acid, citric acid, or maleic acid. In some embodiments, impurities such as metals and peroxides are removed by a mechanical device such as but not limited to a filter, for example a filter. In some embodiments, filtering may also include the use of a filter aid, such as alumina, silica, bleaching clays and/or diatomaceous earth (DE). In some embodiments, the filter is precoated with a filter aid. In other embodiments, additional filter aid, such as silica may be added, and the impurity (e.g., a metal) absorbs onto the filter aid and are trapped by the filter. The amount of filter aid added may be from about 0.1% to 1% of the weight of oil processed, e.g., from about 0.1, 0.2, 0.3, 0.4, 0.5, 0.6, 0.7, 0.8, 0.9, or 1.0% by weight of oil processed.

Prior to or during the pretreatment step, the pH of the feedstock can be neutralized if desired. For example, if the feedstock comprises crude oil, the oil can be neutralized with a base to increase the pH to between about 5.0 and 7.5, between about 5.5 and 7.5, between about 5.5 and 7.0, between about 5.5 and 6.5, between about 5.5 and 6.0, between about 6.0 and 7.5, between about 6.0 and 7.0, between about 6.0 and 6.5, between about 6.2 and 6.8, e.g., less than about, at least about and/or about 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, and 7.5. In some embodiments, the pretreated feedstock is clarified to remove water and insolubles. The clarification step can be performed at an elevated temperature, for example, between about 120 and about 200 degrees F., between about 160 and about 200 degrees F., between about 160 and about 190 degrees F., between about 170 and about 190 degrees F., and between about 180 and about 190 degrees F., e.g., less than about, at least about and/or about 120° F., 122° F., 125° F., 127° F., 129° F., 131° F., 133° F., 135° F., 137° F., 139° F., 141° F., 143° F., 145° F., 147° F., 149° F., 151° F., 153° F., 155° F., 157° F., 159° F., 161° F., 163° F., 165° F., 167° F., 168° F., 171° F., 173° F., 175° F., 177° F., 179° F., 181° F., 183° F., 185° F., 187° F., 189° F., 191° F., 193° F., 195° F., 197° F. and 199° F. The clarification step can remove from about 50% to about 90%, from about 60% to about 90%, from about 70% to about 90%, or from about 70% to about 80% of the water in the feedstock, e.g., at least about and/or about 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89% and 90% of the water can be removed. The clarification step can remove from about 50% to 97%, from about 60% to about 97%, from about 70% to about 97%, from about 80% to about 97%, or from about 90% to about 97% of the insolubles from the feedstock, e.g., at least about and/or about 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96% and 97% of the insoluble can be removed.

In some embodiments, the feedstock stream is washed with water to remove contaminants, and the water and dissolved contaminants are separated from the feedstock stream using one or more mechanical devices such as a clarifier or centrifuge. In some embodiments, the temperature of the water wash is between about 120 and about 200 degrees F., between about 160 and about 200 degrees F., between about 160 and about 190 degrees F., between about 170 and about 190 degrees F., or between about 180 and about 190 degrees F., e.g., less than about, at least about and/or about 120° F., 122° F., 125° F., 127° F., 129° F., 131° F., 133° F., 135° F., 137° F., 139° F., 141° F., 143° F., 145° F., 147° F., 149° F., 151° F., 153° F., 155° F., 157° F., 159° F., 161° F., 163° F., 165° F., 167° F., 168° F., 171° F., 173° F., 175° F., 177° F., 179° F., 181° F., 183° F., 185° F., 187° F., 189° F., 191° F., 193° F., 195° F., 197° F., 199° F. and 200° F. In some embodiments, the amount of water added during the wash is between about 1% and about 5% by weight, e.g., about 1%, 2%, 3%, 4%, or 5% by weight. In some embodiments, the water wash retention time is between about 5 and about 30 minutes, e.g., about 5, 10, 15, 20, 25, or 30 minutes. Following the water wash, the water and insolubles are separated from the feedstock. In some embodiments, about 70% to about 94%, about 80% to about 94%, or about 85% to about 90%, of the water is removed from the feedstock, e.g., at least about and/or about 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93% and 94% of the water is removed. In some embodiments, about 90-99% of the insolubles initially present in the feedstock are removed from the feedstock by the separation step, e.g., at least about and/or about 90%, 91%, 92%, 93%, 94%, 95%, 96%, 97%, 98%, and 99% of the insolubles are removed.

The pretreatment can further comprise drying the clarified feedstock to remove the wash water, for example, by using heat and/or vacuum. In some embodiments, the feedstock is dried at a temperature between about 160 and 200 degrees F., between about 160 and about 190 degrees F., between about 170 and about 190 degrees F., or between about 180 and about 190 degrees F., e.g., less than about, at least about and/or about 160° F., 162° F., 164° F., 166° F., 168° F., 170° F., 172° F., 174° F., 176° F., 178° F., 180° F., 182° F., 184° F., 186° F., 188° F., 190° F., 192° F., 194° F., 196° F., 198° F. and 200° F. In some embodiments, the feedstock is dried at a pressure of about 1 to 15 psi, e.g., less than about, at least about and/or about 1, 2, 3, 4, 5, 6, 7, 8, 9, 10, 11, 12, 13, 14 and 15 psi. In some embodiments, the feedstock is dried to remove between about 0% to about 50%, between about 10% to about 40%, between about 20% to about 40%, or between about 30% to about 35% of the water remaining in the feedstock, e.g., less than about, at least about and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50% of the remaining water is removed during the drying step.

The dried feedstock (e.g., oil) can be treated to remove impurities such as metals. In some embodiments, the feedstock is filtered to remove impurities without substantially reducing the amount of free fatty acids in the feedstock. In some embodiments, the feedstock is filtered at a temperature between about 160 and 200 degrees F., between about 160 and about 190 degrees F., between about 170 and about 190 degrees F., or between about 170 and about 180 degrees F., e.g., less than about, at least about and/or about 161° F., 163° F., 165° F., 167° F., 168° F., 171° F., 173° F., 175° F., 177° F., 179° F., 181° F., 183° F., 185° F., 187° F., 189° F., 191° F., 193° F., 195° F., 197° F., 199° F. and 200° F. In some embodiments, the feedstock is retained on the filter for about 15 to 25 minutes. In some embodiments, the filter comprises about 0.1% to 1.0% by weight of silica, e.g., less than about, at least about and/or about 0.1%, 0.2%, 0.3%, 0.4%, 0.5%, 0.6%, 0.7%, 0.8%, 0.9% and 1.0% by weight silica.

In some embodiments, the filtration step removes at least about 30% to about 95%, at least about 35% to about 65%, at least about 40% to about 55%, or at least about 45% to about 50% of the calcium present in the pretreated feedstock, e.g., at least about and/or about 31%, 33%, 35%, 37%, 39%, 41%, 43%, 45%, 47%, 49%, 51%, 53%, 55%, 57%, 59%, 61%, 63%, 65%, 67%, 69%, 71%, 73%, 75%, 77%, 79%, 81%, 83%, 85%, 87%, 89%, 91%, 93%, and 95% of the calcium is removed. In some embodiments, the filtration step removes at least about 50% to about 95%, at least about 50% to about 85%, at least about 50% to about 65%, or at least about 55% to about 60% of the magnesium present in the pretreated feedstock, e.g., at least about and/or about 51%, 53%, 55%, 57%, 59%, 61%, 63%, 65%, 67%, 69%, 71%, 73%, 75%, 77%, 79%, 81%, 83%, 85%, 87%, 89%, 91%, 93%, and 95% of the magnesium is removed. In some embodiments, the filtration step removes at least about 40% to about 99%, at least about 50% to about 90%, at least about 60% to about 80%, or at least about 70% to about 80% of the sodium present in the pretreated feedstock, e.g., at least about and/or about 41%, 43%, 45%, 47%, 49%, 51%, 53%, 55%, 57%, 59%, 61%, 63%, 65%, 67%, 69%, 71%, 73%, 75%, 77%, 79%, 81%, 83%, 85%, 87%, 89%, 91%, 93%, 95%, 97% and 99% of the sodium is removed. In some embodiments, the filtration step removes at least about 60% to about 97%, at least about 65% to about 90%, at least about 70% to about 85%, or at least about 70% to about 80% of the phosphorus present in the pretreated feedstock, e.g., at least about and/or about 61%, 63%, 65%, 67%, 69%, 71%, 73%, 75%, 77%, 79%, 81%, 83%, 85%, 87%, 89%, 91%, 93%, 95% and 97% of the phosphorus is removed. In some embodiments, the filtration step removes at least about 10% to about 50%, at least about 20% to about 40%, or at least about 20% to about 30% of the sulfur present in the pretreated feedstock, e.g., at least about and/or about 11%, 13%, 15%, 17%, 19%, 21%, 23%, 25%, 27%, 29%, 31%, 33%, 35%, 37%, 39%, 41%, 43%, 45%, 47%, 49% and 50% of the sulfur is removed. The pretreatment step can remove dissolved metals during the water wash and filtration steps.

Conventional pretreatment steps are designed to remove free fatty acids, in part because conventional alkaline catalysts that catalyze the production of fatty acid alkyl esters may be inactivated by free fatty acids, and the reaction may produce undesirable soaps and other products that inhibit downstream processes. Because the catalyst described herein converts both free fatty acids and fatty acid glycerides to fatty acid alkyl esters in a single step, there is no need to remove free fatty acids from the feedstock during the pretreatment step. Thus, in some embodiments, the pretreatment step does not include or require acid esterification of the FFAs in the feedstock stream. Thus, an advantage of the process described herein is that it is capable of producing fatty acid alkyl esters from feedstocks comprising high levels of free fatty acids.

Accordingly, in one embodiment, a process for making a fatty acid alkyl ester from a mixture comprising a fatty acid glyceride and a free fatty acid, is provided. The mixture comprises at least one component selected from the group consisting of a gum, a suspended solid, a metal, and combinations thereof. The process further comprises a) purifying the mixture by: i) contacting the mixture with water; ii) separating the mixture to reduce the amount of at least one component from the mixture while the amount of fatty acid relative to the amount of fatty acid glyceride in the mixture is substantially the same; and iii) drying the mixture. The at least one component can be a gum, a suspended solid, a dissolved metal, or combinations thereof. The component can be separated from the mixture using a mechanical device such as a filter, or a centrifuge.

In some embodiments, the amount of free fatty acid relative to the amount of fatty acid glyceride in the mixture remains substantially the same after the separation step (iii). Following the separation step, the purified mixture is contacted with an alcohol and at least one catalyst to obtain a fatty acid alkyl ester. The catalyst is contained in one or more reactors. In some embodiments, the catalyst is contained in two reactors. In some embodiments, the process is a continuous flow process using two reactors in series. In some embodiments, the process is a batch process.

The process described herein can reduce the level of undesirable components in the feedstock prior to contacting the catalyst to very low levels. For example, the amount of a given component can be reduced by at least about 10, 15, 20, 25, 30, 35, 40, 45, 50, 55, 60, 65, 70, 75, 80, 85, 90, 95, 96, 97, 98, or 99% by weight of the component when the purified mixture contacts the catalyst relative to the total weight of the component before the separating step. For example, in some embodiments, the amount of suspended solids is reduced by about 50, 55, 60, 65, 70, 75, 80, 85, 90, 95, 96, 97, 98, or 99% by weight after the separation step. In some embodiments, the amount of dissolved metal is reduced by about 10 to about 99% by weight, e.g., less than about, at least about and/or about 10, 15, 20, 25, 30, 35, 40, 45, 50, 55, 60, 65, 70, 75, 80, 85, 90, 95, 96, 97, 98, or 99% by weight, after the separation step. In some embodiments, the amount of gum is reduced by about 60, 65, 70, 75, 80, 85, 90, 95, 96, 97, 98, or 99% by weight after the separation step.

In some embodiments, the purified mixture contains less than about 100 ppm of the at least one component when the purified mixture contacts the catalyst based on the total weight of the purified mixture. For example the purified mixture can contain less than about 100, 90, 80, 70, 60, 50, 40, 30, 20, 10, 9, 8, 7, 6, 5, 4, 3, 2 or 1 ppm of the at least one component when the purified mixture contacts the catalyst based on the total weight of the purified mixture.

In some embodiments, the component is a gum selected from the group consisting of a phosphorous containing compound, such as a phospholipid, a hydratable or non-hydratable phosphatide, and a lecithin.

In some embodiments, the component is a suspended solid selected from the group consisting of a wax, cellulose and the like.

In some embodiments, the component is a metal selected from the group consisting of sodium, potassium, phosphorous, magnesium, and calcium.

In some embodiments, the component is sulfur.

The pretreatment process described herein is generally applicable to biofuel production facilities having fixed bed (i.e., solid phase), active surface metal catalysts, including acid catalysts.

Catalyst Reactors

Following the pretreatment step, the feedstock comprising fatty acid glycerides and free fatty acid is reacted with an alcohol to produce fatty acid alkyl esters (e.g., fatty acid methyl esters or FAME), glycerin, and water. In some embodiments, the alcohol is methanol. In some embodiments, the process produces a fatty acid alkyl ester stream comprising alkyl esters of fatty acids selected from myristic, palmitic, palmitoleic, stearic, oleic, linoleic, linolenic, alpha-linolenic acid (ALA), gamma-linolenic acid (GLA), and arachidic acids, and mixtures thereof.

In some embodiments, the reaction is at elevated temperature and pressure. For example, the reaction temperature can be from about 170 to about 220 degrees C., and the pressure can be from about 40-55 bar. The reaction occurs in a single process step by contacting the fatty acid glycerides and free fatty acids with a catalyst. In some embodiments, the reaction occurs in two reactors placed in series, wherein each reactor contains the catalyst. In some embodiments, the process described herein is a continuous process using two reactors.

In some embodiments, the catalyst is fixed in the reactors. For example, in some embodiments, the reactor is a fixed bed reactor, a continuously stirred tank reactor, a fluidized bed reactor or an ebullating bed reactor. Other reactor designs that allow continuous flow of the fatty acid glyceride feedstock stream, alcohol stream, the fatty acid glyceride feedstock/alcohol stream or mixtures thereof over the catalyst and through the reactor are within the scope of this disclosure. In some embodiments, the catalyst is activated prior to introducing feedstocks into the reactor. In some embodiments, the catalyst is activated by introducing a heated stream of dry inert gas (e.g., nitrogen) into the contacting zones at a known space velocity (SV=vol $N_2$/hr divided by vol of catalyst) at atmospheric pressure. Activating the catalyst can involve heating the reactor contents to remove residual water, which promotes hydrolysis. In some embodiments, the catalyst may be heated at different temperatures for set periods of time. The heating cycle may be repeated until less than 1 ppm of water or no water is detected in the catalyst.

The unconsumed alcohol reactant from the reaction can be recovered and returned to the reactors after undergoing a purification step. The alcohol can be recovered and purified using a conventional alcohol/water distillation column.

The reaction product (e.g., biodiesel) can then be purified with a water wash to remove the free glycerin and other side reaction products produced in the reactors. The reaction product can be further refined in a vacuum distillation unit that removes remaining monoglycerides, diglycerides, triglycerides, and total glycerin to levels below what is specified by ASTM D6751. In some embodiments, the glycerin co-product is recovered from the reaction product via gravity separation and then purified by removing the methanol and water.

According to some embodiments, the process described herein is for making a fatty acid alkyl ester from a mixture comprising a fatty acid glyceride; the process comprising:
 a) contacting the mixture with an alcohol and a heterogeneous acid catalyst in a first reactor to produce a first reaction mixture;
 b) transferring the first reaction mixture to a second reactor, and
 c) contacting the first reaction mixture with additional alcohol and a heterogeneous acid catalyst to produce a second reaction mixture comprising a fatty acid alkyl ester, unreacted alcohol, and glycerin; wherein the acid number of the second reaction mixture is less than about 0.5, 0.4, 0.3, 0.2, or 0.1.

In some embodiments, the mol. % conversion to fatty acid alkyl ester made is greater than the mol. % conversion made using two reactors in parallel under substantially identical reaction conditions. In some embodiments, the mol % conversion of fatty acid glyceride to fatty acid alkyl ester obtained is at least about 95 mol % based on the isolated glycerin yield.

The temperature and pressure in the reactor can be controlled, such that the first and/or second reaction mixture is contacted with the heterogeneous acid catalyst under conditions of elevated temperature and pressure. In some embodiments, the temperature in the reactor is in the range of from about 165 degrees C. to about 260 degrees C., or from about 190 degrees C. to about 210 degrees C., and a pressure of from about 0.21 MPa to about 5.5 MPa, for a period of about 2 to about 6 hours.

In some embodiments, the temperature in the reactors is between about 200 degrees F. and about 500 degrees F., between about 300 degrees F. and about 500 degrees F., between about 300 degrees F. and about 475 degrees F., between about 350 degrees F. and about 450 degrees F., between about 350 degrees F. and about 425 degrees F., or between about 350 degrees F. and about 400 degrees F.

In some embodiments, the pressure in the reactors is between about 250 and about 850 psia, for example, between about 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845 and 850 psi. In some embodiments, the alcohol to fatty acid glycerides (e.g., oil) molar ratio in the reaction is from about 10:1 to about 480:1, e.g., less than about, at least about and/or about 10:1, 11:1, 12:1, 13:1, 14:1, 15:1, 16:1, 17:1, 18:1, 19:1, 20:1, 25:1, 30:1, 35:1:, 40:1, 45:1, 50:1, 55:1, 60:1, 65:1, 70:1, 75:1, 80:1, 85:1, 90:1, 95:1, 100:1, 105:1, 115:1, 125:1, 135:1, 145:1, 155:1, 165:1, 175:1, 185:1, 195:1, 205:1, 215:1, 225:1, 235:1, 245:1, 255:1, 265:1, 275:1, 285:1, 295:1, 305:1, 315:1, 325:1, 335:1, 345:1, 355:1, 365:1, 375:1, 385:1, 395:1, 405:1, 415:1, 425:1, 435:1, 445:1, 455:1, 465:1, 475:1 and 480:1. In some embodiments, the alcohol is methanol, and the methanol to fatty acid glycerides molar ratio in the first reactor is lower that the methanol to fatty acid glycerides molar ratio in the second reactor. For example, in some embodiments, the methanol to fatty acid glycerides molar ratio in the first reactor is between about 10:1 and 20:1, (e.g., less than about, at least about and/or about 10:1, 11:1, 12:1, 13:1, 14:1, 15:1, 16:1, 17:1, 18:1, 19:1, or 20:1), and the methanol to fatty acid glycerides molar ratio in the second reactor is between about 70:1 and 90:1 (e.g., less than about, at least about and/or about 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, or 90:1).

The molar ratio is calculated as [lbmol/h methanol[/[lbmol/h convertible oil components] (i.e., Triglycerides, Monglycerides, Diglycerides, and free fatty acids).

In some embodiments, the percent of fatty acid glyceride feedstock converted to fatty acid alkyl esters is at least about 50% to 99% by weight, e.g., less than about, at least about and/or about 51%, 53%, 55%, 57%, 59%, 61%, 63%, 65%, 67%, 69%, 71%, 73%, 75%, 77%, 79%, 81%, 83%, 85%, 87%, 89% and 90% by weight. The percent conversion is calculated as [1−(lb/hr unconverted feedstock in reactor product)/(lb/hr convertible feedstock entering lead reactor)]*100.

In some embodiments, the acid number in the fatty acid alkyl ester product is less than about 0.5, e.g., less than about 0.4, 0.3, 0.2, or 0.1.

In some embodiments, the pressure and temperature of the reaction mixture is decreased to separate a substantial amount of the alcohol from the reaction mixture while the amount of the fatty acid alkyl ester is substantially the same (i.e., the amount of fatty acid alkyl ester is not substantially reduced by the decrease in pressure and temperature). The pressure can be reduced by applying a vacuum to the separation unit, for example, a pressure of about 0.065 Mpa. In some embodiments, the alcohol is separated from the reaction mixture using one or more flash separators. In some embodiments, the temperature of the reaction mixture in the flash separator is between about 120 degrees and 400 degrees F., between about 200 degrees and 350 degrees F., between about 250 degrees and 350 degrees F., or between about 275 degrees and 325 degrees F., e.g., less than about, at least about and/or about 121° F., 125° F., 129° F., 133° F., 137° F., 141° F., 145° F., 149° F., 153° F., 157° F., 161° F., 165° F., 169° F., 173° F., 177° F., 181° F., 185° F., 189° F., 193° F., 197° F., 201° F., 205° F., 209° F., 213° F., 217° F., 221° F., 225° F., 229° F., 233° F., 237° F., 241° F., 245° F., 249° F., 253° F., 257° F., 261° F., 265° F., 269° F., 273° F., 277° F., 281° F., 285° F., 289° F., 293° F., 297° F., 301° F., 305° F., 309° F., 313° F., 317° F., 321° F., 325° F., 329° F., 333° F., 337° F., 341° F., 345° F., 349° F., 353° F., 357° F., 361° F., 365° F., 369° F., 373° F., 377° F., 381° F., 385° F., 389° F., 393° F., 397° F. and 400° F. In some embodiments, the pressure of the reaction mixture in the flash separator is between about 5 and 50 psia, between about 10 and 40 psia, between about 20 and 40 psia, or between about 25 and 35 psia, e.g., less than about, at least about and/or about 5, 7, 9, 11, 13, 15, 17, 19, 21, 23, 25, 27, 29, 31, 33, 35, 37, 39, 41, 43, 45, 47, 49 and 50 psi. In some embodiments, the amount of alcohol removed in the flash separation step is between about 85% and 99.5%, between about 90% and 99.5%, or between about 95% and 99.5%, e.g., at least about and/or about 85, 86, 87, 88, 89, 90, 91, 92, 93, 94, 95, 96, 97, 98, 99, and 99.5% of the alcohol present in the reaction mixture is removed. In some embodiments, the alcohol is methanol. In some embodiments, the amount of water in the reaction mixture removed in the flash separation step is between about 90% and 99%, e.g., at least about and/or about 90, 91, 92, 93, 94, 95, 96, 97, 98, and 99% of the water present in the reaction mixture is removed.

In some embodiments, the reaction mixture stream enters a separation unit under low pressure and the pressure is rapidly reduced. In some embodiments, the separation unit operates under a slight vacuum, that removes components having a boiling point of less than 100 degrees C. (for example, methanol, ethanol and/or water) to be rapidly removed. In some embodiments, the separation unit is a flash evaporation unit which operates under a slight vacuum, enabling low boiling alcohols (for example, methanol and ethanol) and other volatiles (for example, water) to be rapidly removed (flashed). The distilled or flash evaporated components may be collected. An average temperature of the low pressure reaction mixture stream may be less than 100 degrees C., or between about 70 degrees C. and about 80 degrees C. at 6.4 psig (0.065 MPa) as the reaction mixture stream enters separation unit. The flow rate of low pressure reaction mixture stream can be about 146.6 lb/hr (about 66.5 kg/hr) or about 0.4 WSHV. Rapid reduction of pressure of reaction mixture t stream can be induced by creating a pressure differential in the separation unit by using a pump. In some embodiments, a vacuum is applied to the top of separation unit until a pressure of about 0.065 MPa is reached. A sudden drop in pressure may induce rapid distillation (evaporation) of the excess alcohol and water from the crude product.

The methanol/water stream can exit the separation unit and be transported to one or more recovery tanks. A portion of methanol/water stream can be mixed with the fatty acid glyceride feedstock stream and/or the alcohol stream. Analysis of the methanol/water stream can be done (for example, using near infrared spectrometry) to determine the amount, if any, of glycerin and/or fatty acid alkyl ester in the methanol/water stream. Based on the analysis, the methanol/water stream can be subjected to further treatment to recover the glycerin and/or fatty acid and/or increase the amount of methanol in the stream. In some embodiments, the methanol/water stream may be primarily water and thus treated as waste water after distillation of the methanol for recycle.

Rapid distillation (for example, flash evaporation) removes the excess alcohol and water under mild thermal conditions. During rapid evaporation, the crude fatty acid alkyl ester undergoes minimal or no thermal degradation during the distillation process. Thus, fewer by-products and a higher quality product are produced as compared to conventional processing to produce fatty acid alkyl esters. During rapid evaporation, the temperature of the crude stream may be increased to assist in rapid evaporation of the alcohol, water, and other volatiles in the crude product stream. Due to the sudden loss of pressure, low boiling alcohols and water evaporate rapidly (flash) and thereby cool the residual effluent. The recovered alcohol can be refined in a separate distillation system for reuse, as needed, in the reactor.

In some embodiments, the process further comprises allowing the glycerin to separate from the rest of the reaction mixture. For example, a reaction mixture comprising a crude fatty acid ester stream can be separated from the glycerin stream using liquid-liquid centrifugation, gravity-based decantation and dynamic centrifugation or other methods familiar to those skilled in the art. In some embodiments, the fatty acid ester stream is separated from the glycerin stream using gravity-based, electrostatically enhanced separation techniques. In some embodiments, the process further comprises applying an electrostatic field to separate the fatty acid alkyl ester from the glycerin. Thus, in some embodiments, the separator is an electrostatic separator. In some embodiments, the crude fatty acid ester/glycerin product stream may be analyzed using near infrared spectrometry to determine an amount of water in the stream prior to the stream entering the separator. The crude fatty acid ester/glycerin product stream may have a water content of less than 2 percent by weight. In the electrostatic separator an electric field (for example, direct current and/or alternating current) may be applied to crude fatty acid ester/glycerin product stream to separate glycerin from crude fatty acid ester stream. The separated glycerin stream can have a purity of greater than 98% by weight.

The reaction mixture comprising a crude fatty acid alkyl ester stream can be further purified to meet product specifications. In some embodiments, the crude fatty acid alkyl ester stream is used as is for diesel fuel. The crude fatty acid alkyl ester stream can be purified in a distillation unit, which produces a fatty acid alkyl ester product stream and a bottoms stream. Distillation units may include, but are not limited to, a wiped-film evaporator or another short-path distillation unit. The fatty acid alkyl ester product stream can contain substantially fatty acid methyl ester, and thus be used for biofuel without further treatment. In some embodiments, the distilled fatty acid alkyl ester product stream is passed through one or more resin beds to produce a high purity, biodiesel product.

In some embodiments, bottoms stream includes polyunsaturated fatty acid alkyl esters (for example, polyunsaturated fatty acid methyl esters). The polyunsaturated fatty acid alkyl acids are derived from polyunsaturated fatty acids present in the starting feedstock. Polyunsaturated fatty acid alkyl esters may be hydrolyzed to produce high purity polyunsaturated fatty acids (for example, omega 3 fatty acids and omega 6 fatty acids).

In some embodiments, the crude fatty acid alkyl ester stream is a fatty acid methyl ester (FAME) stream. At least a portion of the crude fatty acid alkyl ester stream may be diverted and used to make biolubricants, heat transfer fluids, hydraulic fluids, gear oils or engine oils in a separate reactor. The ability to make biodiesel and biolubricants at the same facility without changing the catalyst or significantly altering the production equipment reduces operating costs.

Alcohols

The transesterification process described herein uses alcohol as a reactant. In some embodiments, bioproducts are produced through esterification of fatty acids with alcohols. The esterification is performed at moderate conditions and shorter reaction times as compared to batch processing and/or other conventional processes. Biodiesel can be produced through esterification of fatty acids with alcohols having carbon numbers ranging from 1 to 4 ($C_1$ to $C_4$). Biolubricants can be produced by transesterification of fatty acid alkyl esters or esterification of fatty acids with alcohols or polyols having a carbon number ranging from $C_5$ to $C_{12}$ or branched alcohols of similar molecular weight. In some embodiments, the alcohol has a carbon number ranging from 1 to 50. In some embodiments, the alcohol is selected from the group consisting of methanol, ethanol, propanol, butanol, pentanol, octanol, 2-ethylhexanol, decanol, dodecanol, polyols, and mixtures thereof. In some embodiments, the alcohol is methanol. In some embodiments, the alcohol is recovered and recycled. In some embodiments, bioproducts are produced by esterification of fatty acid glycerides with of one or more alcohols using a heterogeneous acidic catalyst described herein.

In some embodiments, the molar ratio of total fatty acid glycerides to alcohol is from about 1:6 to about 1:100, from about 1:10 to about 1:90, or from about 1:10 to about 1:80. In some embodiments, the alcohol is methanol and the molar ratio of total fatty acid glycerides to methanol is greater than 1:10, such as 1:11, 1:12, 1:13, 1:14, 1:15, 1:16, 1:17, 1:18, 1:19, 1:20, 1:25, 1:30, 1:35, 1:40, 1:45, 1:50, 1:55, 1:60, 1:65, 1:70, 1:75, 1:80, 1:85, 1:90, 1:95, or 1:100. In some embodiments, the alcohol is methanol and the molar ratio of free fatty acids to methanol is greater than 1:10, such as 1:11, 1:12, 1:13, 1:14, 1:15, 1:16, 1:17, 1:18, 1:19, 1:20, 1:25, 1:30, 1:35, 1:40, 1:45, 1:50, 1:55, 1:60, 1:65, 1:70, 1:75, 1:80, 1:85, 1:90, 1:95, or 1:100.

Catalyst

The catalysts described herein can produce fatty acid alkyl esters from a feedstock comprising fatty acid glycerides and free fatty acids with high efficiency in a one-step reaction. In some embodiments, the catalyst is a solid catalyst. In some embodiments, the catalyst is a heterogeneous acidic catalyst. Exemplary heterogeneous acidic catalysts useful in the process described herein are described in U.S. Pat. No. 8,124,801 as is used in the Benefuel ENSEL® process, and U.S. Patent Publication 2012/0232300, which is incorporated by reference herein in its entirety.

In some embodiments, the catalyst comprises a metal from Group 6 (IUPAC numbering; (group VIB of the Chemical Abstracts Service (CAS) system) of the periodic table. Thus, in some embodiments, the catalyst comprises one or more metals selected from chromium (Cr), molybdenum (Mo) or Tungsten (W), or inorganic salts and/or oxides thereof. The amount of the Group 6 metal catalyst can range from about 0.01% to about 10% by weight of the catalyst. 0.01%, 0.1%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5% and 10.0%.

The catalyst can also comprise a promoter. In some embodiments, the promoter is selected from one or more elements of Group 15 (group VA CAS) of the periodic table. In some embodiments, the promoter is phosphorous or a phosphorous containing compound. In some embodiments, the amount of promoter ranges from about 0.1% to about 7%, by weight of the catalyst such as 0.1%, 0.5%, 1.0%, 1.5%, 2.0%, 2.5%, 3.0%, 3.5%, 4.0%, 4.5%, 5.0%, 5.5%, 6.0%, 6.5% and 7.0%.

The catalyst can also include a co-promoter selected from Groups IA, IIA, IIIB, and VIIIB (CAS) of the periodic table. In some embodiments, the co-promoter is sodium, potassium, calcium, lanthanum, or nickel. In some embodiments, the amount of promoter ranges from about 0.0001% to about 10%, by weight of the catalyst such as 0.001, 0.01, 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5% and 10.0%.

In some embodiments, the catalyst comprises a metal ion on a support wherein the metal ion is selected from the group consisting of molybdenum (Mo), iron (Fe), cobalt (Co) and chromium (Cr). In some embodiments, the concentration of catalyst used is 1-2 wt. % based on the weight of the fatty acid glyceride. In some embodiments, the catalyst is reusable by recycling without significant loss in activity.

The catalyst can be supported on oxides of metals from Group 13 (IIIA CAS) of the periodic table. For example, in some embodiments, the support comprises oxides of aluminum or titanium.

The Group 6 (VIB) metals, promoters, co-promoters, or mixtures thereof may be supported on one or more oxides of one or more metals from Group IIIA (CAS) of the Periodic Table. Examples of Group IIIA metal oxides (refractory oxides) include, but are not limited to, alumina oxide and/or titanium oxide. The refractory inorganic oxide may be of synthetic or natural origin and have a medium to a high surface area, and a well developed pore structure. In an embodiment, hydrated alumina, when used as a support material, results in a product where the morphology of the active materials is well maintained in the resulting catalyst composition.

The catalytic metals (for example, Group VIB metals) may be applied to a formed or unformed support by one of several methods known in the art. This is usually followed by forming, if necessary, and by calcinations to convert the catalytic metal compounds to oxides. U.S. Pat. No. 3,287,280 to Colgan et al. and U.S. Pat. No. 4,048,115 to O'Hara, both of which are incorporated herein by reference describe methods for the preparation of supported catalysts.

The intermediate support material of the catalyst may be prepared by either a solid mixing method or by a solution addition and subsequent mixing method. In both cases, the precursor of the support material (for example, alumina oxide) is well peptized with suitable mineral acid, for example, nitric acid and acetic acid. In an embodiment, nitric acid in the range of 1.0-10.0% of the support mass is used for peptization. The support precursor may be any of the Group IIIA or IVA refractory metal oxides or their combinations. In an embodiment, the Group IIIA metal oxide is alumina. In certain embodiments, a Group IIIA metal oxide is peptized with a mineral acid in the range of about 1% to about 10% or about 2% to 8%, or about 3% to about 7% by weight of the support material. For example, alumina oxide is peptized with nitric acid. In an embodiment, blending of various precursors of these metal oxides is performed to obtain suitable pore size distribution.

After peptization, active catalytic compounds, for example, metal oxides precursors of Group VIB, may be added along with the promoter selected from Group VA of the Periodic Table and/or co-promoter. In some embodiments, the co-promoter is added prior to forming the catalyst (for example, during extrusion), but before drying and/or calcination of the catalyst. The composition of the active metal, for example, molybdenum, may be incorporated using impregnation, compounding, extruding trials, various combinations of the processes described herein, or methods known in the art. A proper selection of appropriate preparation conditions may be made using methods known in the art. In some embodiments, the active metal precursor, the promoter precursor, and/or co-promoter may be added either as separate compounds or together as slurry. For example, the metal precursor and the promoter precursor may be combined by mixing two aqueous solutions together. An appropriate morphology and texture of the metal components may be achieved by applying suitable methods and combination of precursors. In an embodiment, the size and shape of the supported systems were to optimize, for example, tuning geometrical surface area. The surface area of the catalyst may range from 50 $m^2/g$ to 300 $m^2/g$.

The catalyst may have a pore volume ranging from 0.2 ml/g to 0.95 ml/g, or from 0.5 ml/g to 0.7 ml/g. Pore volume of samples may be determined by filling the pore space to saturation by applying water. The quantity of water is determined by its volume added or the weight increase of the sample. The pore space can be filled by putting the quantitatively known sample in excess water and the excess water is removed, and the saturated catalyst samples were weighed again to determine the total water uptake.

In some embodiments, the catalyst composition resulting from the above described process may be directly shaped. Shaping includes extrusion, pelletizing, beading, and/or spray drying. In some embodiments, spray drying or beading is generally used when the catalyst composition is used in slurry type reactor, fluidized beds, moving beds, expanded beds, or ebullating beds. For fixed bed applications, the catalyst composition may be extruded, pelletized or beaded. In fixed bed applications, prior to or during the shaping, any additives that facilitate the shaping may be used.

The resulting catalyst composition or more suitably the catalyst intermediate may be, after an optional drying step, be optionally calcined. Calcinations temperatures may range from about 100 degrees C. to 600 degrees C., or from about 350 degrees C. to 500 degrees C. for a time varying from 0.5 to 48 hours. In certain embodiments, the catalyst samples are calcined at temperatures ranging from 400 degrees C. to 500 degrees C., or from 500 degrees C. to 700 degrees C.

The resultant extrudates may be further loaded with active metals to obtain the desired active metal composition for the finished product. Such further loading is directly related to the desired metal loading, and the amount incorporated during or prior to the shaping stage of the material. For the same, various impregnation methods known in the art can be applied. Either the wet impregnation or the incipient impregnation may be used to load active metals. In an embodiment, the pore filling incipient impregnation method may be applied to load the Group VI B metal oxides. The method employed also may affect the pore size distribution of the finished catalyst, and hence the performance of the product. The material is again to be further thermal treated for the activation of the catalytic components.

In some embodiments, a double metal catalyst may be used such as those listed in U.S. Pat. Nos. 5,482,908; 5,536,883; 6,624,286; 6,764,978; 7,482,480; 7,754,643; and 7,842,653. In some embodiments, a double metal cyanide catalyst may be used. In some embodiments, the catalyst is used alone or in combination with the Group IVB metal oxide catalyst described herein. One of metals of the double metal cyanide catalyst is $Zn^{2+}$ while the other is Fe. Co-existence of Zn and Fe in the active site linking through cyano bridges makes it efficient to transform feedstocks containing fatty acids in a single step to fatty acid esters. The catalyst could be separated easily by centrifugation or by simple filtration and reused. Double metal cyanide catalysts are described in U.S. Pat. No. 7,754,643 to Srinivas, U.S. Pat. No. 7,482,480 to Srinivas, and U.S. Pat. No. 7,842,653 to Srinivas, which are incorporated herein by reference. For example, a double metal cyanide catalyst may be used alone or in combination with a molybdenum metal catalyst containing phosphorus as a promoter.

The catalysts described herein are highly efficient and are easily separated from the products for further re-use. In contrast, prior art catalysts may require treatment with mineral acid, alkali bases, and lipases which may increase costs of catalyst separation. The catalyst described herein is beneficial and leads to an economic and eco-friendly process. Hence, the solid catalysts described herein are not only efficient but avoid the tedious process of catalyst recovery characteristic of the prior art processes. The present catalyst system is efficient without using any additional solvent.

In batch processing to produce fatty acid alkyl esters, a fatty acid glyceride, an alcohol, and a solid catalyst are contacted to produce a reaction mixture. The catalyst used in a batch process may be a finely powdered catalyst. Although the catalyst may remain in a separate phase, or substantially separate phase from the fatty acid glyceride, alcohol and/or reaction products during contacting, the catalyst is separated from the liquid reaction mixture prior to the removal of methanol and/or glycerin using separation techniques known in the art, for example, centrifugation followed by simple decantation. The resulting catalyst free liquid reaction mixture may be separated by removal of excess alcohol through distillation techniques. Removal of the alcohol allows the fatty acid methyl esters to separate from remaining products. Fatty acid methyl esters may be separated from the reaction mixture by gravity separation or by contacting the reaction mixture with a non-polar solvent. In some embodiments, the non-polar solvent is petroleum ether.

In contrast to a batch process, the continuous process is used to produce bioproducts, as described herein, eliminates the need for catalyst separation and/or the saponification step used in conventional alkaline catalyst processes. The reaction may be conducted using minimal or substantially no solvent which reduces production of by-products and/or reduces costs of the process as compared to conventional processing. The process conditions allow for increased glycerol purity and fatty acid methyl ester yield as compared to products produced using conventional alkaline catalyst processing. The process described herein also reduces the formation of undesirable by-products, for example, glycerol methyl ethers.

The use of a two reactor system and the catalyst described herein results in highly efficient conversion of the feedstock to a product. Thus, the conversion of a feedstock comprising fatty acid glycerides is in the range of about 85-95% in the first reactor, and is about 95-99% of total triglycerides in the second reactor. In some embodiments, essentially all fatty acids entering the reactors will be converted to fatty acid alkyl esters (e.g., FAME) and water.

The process described herein can further comprise controlling various flow rates of the process streams to optimize production of biofuels and desirable coproducts. In some embodiments, the process further comprises controlling a flow rate of the mixture of fatty acid glycerides to the reactor. In some embodiments, the flow rate of the stream comprising the mixture of fatty acid glycerides (fatty acid glyceride stream) to the reactor ranges from about 0.1 to about 1.0 Weight Hourly Space Velocity ("WHSV"), e.g., less than about, at least about and/or about 0.1, 0.2, 0.3, 0.4, 0.5, 0.6, 0.7, 0.8, 0.9 or about 1.0 WHSV. In some embodiments, the process comprises controlling a flow rate of the alcohol to the reactor. In some embodiments, the flow rate of the alcohol stream to the reactor ranges from about 0.1 to about 1.0 WHSV, e.g., less than about, at least about and/or about 0.1, 0.2, 0.3, 0.4, 0.5, 0.6, 0.7, 0.8, 0.9 or about 1.0 WHSV.

In some embodiments, the fatty acid glyceride stream is mixed with the alcohol stream to produce a fatty acid glyceride/alcohol stream that is delivered to the reactors. In some embodiments, the combined fatty acid glyceride/alcohol stream flows upward through the reactor. In some embodiments, the flow rate of the fatty acid glyceride/alcohol stream through the reactor ranges from about 0.1 to about 1.0 WHSV, e.g., less than about, at least about and/or about 0.1, 0.2, 0.3, 0.4, 0.5, 0.6, 0.7, 0.8, 0.9 or about 1.0 WHSV.

In some embodiments, the process comprises controlling the flow rate of the reaction mixture from the reactor under conditions suitable to maintain continuous operation of the reactor. In some embodiments, the reaction mixture exiting the reactor is at a temperature of about 200 degrees C. to about 250 degrees C. and a pressure of about 800-1000 psia. In some embodiments, the flow rate of the reaction mixture exiting the reactor is from about 0.1 to about 1.0 WHSV, e.g., less than about, at least about and/or about 0.1, 0.2, 0.3, 0.4, 0.5, 0.6, 0.7, 0.8, 0.9 or about 1.0 WHSV.

In some embodiments, the flow rate of the mixture of fatty acid glycerides to the reactor and the flow rate of the alcohol to the reactor is controlled such that the molar ratio of fatty acid glyceride to alcohol used is in the range of 1:6 to 1:50.

In some embodiments, the process further comprises analyzing the concentration of fatty acid glycerides, alcohol, fatty acid alkyl ester, glycerin, or other components from the reaction mixture; and adjusting the reaction conditions based on at least one of the assessed concentrations. Examples of reaction conditions include temperature, pressure, pH, flow rate, mass ratios, and combinations thereof. In some embodiments, the concentration of components from the reaction mixture and/or reaction conditions is analyzed or monitored continuously in real-time. The process can be analyzed using one or more analytic devices, for example, near infrared spectrometers, liquid chromatographs, gas chromatograph, mass spectrometers, nuclear magnetic resonance spectrometers or combinations thereof. In some embodiments, the one or more analyzers are coupled to one or more units of the continuous process. In some embodiments, the analyzer is an infrared fiber-optic probe or a flow cell coupled to one or more units.

In some embodiments, the process stream is monitored. For example, the absence or appearance of products may be monitored using near infrared spectrometry. During the continuous process, real-time monitoring of the changes in the data (for example, changes in the near infrared spectrum) within the process at critical points provides data continuously on the relative concentrations of fatty acid glycerides, glycerides, fatty acid alkyl esters, glycerin and other components. Based on the assessment of the monitored relative concentrations, adjustments to process conditions may inhibit by-product formation and/or allow production of high quality fatty acid alkyl esters. Based on the monitored conditions, adjustments may not be necessary.

In some embodiments, data from one or more continuous processes may be collected continuously or at specified intervals and compiled into data sets. Such data sets include a) conversion data for various fatty acid glyceride feedstocks to fatty acid alkyl esters, b) catalyst aging, c) fatty acid glyceride feedstock selection (for example, selection based on the content of free fatty acid in feed and/or other impurities in the fatty acid glyceride feedstock), d) product quality, both for fatty acid alkyl esters and glycerin, e) purity of recycled alcohol, f) composition of fatty acid alkyl esters and the fatty acid alkyl esters distillation residues and g) the quality of final product. Other types of data may be collected, as necessary. Data may be collected from one or more process steps and compared across locations, time periods and age of facilities, among other factors. The stored data may be compared and conditions may be adjusted over time based on fatty acid glyceride feedstock and fatty acid glyceride feedstock suppliers, the seasonal variation in renewable fatty acid glyceride feedstocks and other operating parameters. In some embodiments, one or more process conditions at one or more locations are adjusted to maintain or improve the quality of the products produced, based on collected data.

Assessing the collected data continuously and in real-time allows assessment of small changes in reaction parameters on total system performance and to adjust these parameters to produce high quality fatty acid alkyl esters. Collecting data may include sending data to a remote server that includes data from the system and other system in a data management system. The data may be compared to other systems and adjustments may be made depending on the assessment of the data. For example, based on the data, the flow rate, temperature, pressure, or mole ratio of methanol to total fatty acid glycerides may be adjusted to increase fatty acid alkyl ester conversion at one or more locations. Additional adjustment points include flow rate, varying pressure and temperature across an alcohol flash evaporator to achieve alcohol recycled economics, and flow rate, distillation take over ratio (ratio of the mass of recovered condensate in a distillation to the mass of the undistilled material) and vacuum in short-path distillation to achieve high quality products. Assessment and adjustment of parameters may lower costs in producing products, thus making production of bioproducts economically feasible. In some embodiments, real time monitoring provides information about the formation of by-products from side reactions. For example, water content in the reactor may be monitored. Production of an excess amount of water may promote hydrolysis of the fatty acid alkyl ester product to alcohols and fatty acids. Based on the assessment of the water content in the reaction mixture, conditions may be adjusted to minimize the amount of water produced during the process.

Products/Co-Products

The present disclosure further provides a product made by a process described herein. Thus, the product can be a biofuel comprising fatty acid alkyl esters. In some embodiments, the product comprises FAME. The present disclosure further provides for the use of a product described herein as a fuel, for example the use of a product comprising fatty acid alkyl esters as a fuel such as biodiesel.

The process also produces reaction mixtures comprising coproducts such as dimethyl ether (DME) and methoxypropanediol (MPD). DME is produced from the reaction of two methanol molecules to produce one molecule of DME and one molecule of water. MPD is produced from the reaction of one molecule of glycerin and one molecule of methanol to produce one molecule of MPD and one molecule of water. Methods for identifying the presence of DME and MPD are known in the art using analytical methods such as GC, HPLC, NIR, FTIR, or similar analytical instruments.

In some embodiments, the reaction produces about 0.04% to 0.25% by weight DME, e.g., about 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24% or 0.25% by weight DME. In some embodiments, the reaction produces about 0.10% to 3.5% by weight MPD, e.g., less than about, at least about and/or about 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4% or 3.5% MPD. The amount of DME and MPD produced is calculated as (lb/hr DME or MPD produced)/(total feed to reactor)*100.

Thus, the instant disclosure provides methods and systems for removing DME and MPD from the fatty acid alkyl ester product. In some embodiments, the DME is removed from the process and concentrated by removing residual alcohol, and the alcohol is recycled into the process. The DME can be used as a supplemental fuel, for example in the hot oil heater (which supplies energy to the vacuum distillation portion of the process). In some embodiments, the MPD is removed from the biodiesel by washing with water, then stripped from the water and combined with the glycerin stream. The process can further comprise identifying and quantifying the amount of MPD removed from the biodiesel.

In some embodiments, the amount of one or more coproducts is reduced from a reaction mixture comprising fatty acid esters while maintaining the amount of fatty acid esters in the reaction mixture. Thus, in some embodiments, the process for making a fatty acid alkyl ester comprises:

a) contacting a mixture comprising a fatty acid glyceride with an alcohol and a heterogeneous acid catalyst to produce a reaction mixture comprising a fatty acid alkyl ester, unreacted alcohol, glycerin, dimethyl ether (DME), and water; and b) reducing the amount of DME from the reaction mixture while maintaining the amount of fatty acid ester; to obtain a fatty acid alkyl ester.

In some embodiments, the process further comprises
i) separating the glycerin from the reaction mixture; and
ii) removing the alcohol, water and DME from the mixture of i) to obtain a fatty acid alkyl ester. In some embodiments, the DME is concentrated and used as a fuel.

In some embodiments, the process for making a fatty acid alkyl ester comprises:

a) contacting a mixture comprising a fatty acid glyceride with an alcohol and a heterogeneous acid catalyst to produce a reaction mixture comprising a fatty acid alkyl ester, unreacted alcohol, glycerin, methoxypropanediol (MPD) and water; and b) reducing the amount of MPD from the mixture while maintaining the amount of fatty acid ester; to obtain a fatty acid alkyl ester.

In some embodiments, the process further comprises:
i) separating glycerin and MPD from the reaction mixture;

ii) washing the reaction mixture from step i with water; to obtain a fatty acid alkyl ester.

In some embodiments, the DME is removed in the methanol dehydration column. In some embodiments, the DME is removed at a temperature of between about 120 and 190 degrees F., and at a pressure of between about 10 and 60 psia. In some embodiments, the DME purity is at least about 50%-99%, at least about 60%-90%, or at least about 70%-80% by weight, e.g., at least about 50, 55, 60, 65, 70, 75, 80, 85, 90, 91, 92, 93, 94, 95, 96, 97, 98, or 99% by weight. In some embodiments, the methanol purity is at least about 90-99% by weight, e.g., at least about 90, 91, 92, 93, 94, 95, 96, 97, 98, or 99% by weight.

In some embodiments, the MPD is removed by washing the fatty acid alkyl ester (e.g., biodiesel) product with water. In some embodiments, fatty acid alkyl ester produce is washed at a temperature of about 100 to about 180 degrees F., using about 1% to about 8% water. In some embodiments, the amount of MPD in the washed fatty acid alkyl ester product is less than about 100 ppm, e.g., less than about 90, 80, 70, 60, 50, 40, 30, 20, 10, 9, 8, 7, 6, 5, 4, 3, 2, or 1 ppm.

Systems

The present disclosure also provides systems for making fatty acid alkyl esters from feedstock comprising fatty acid glycerides. The system can comprise three sub-systems that operate together or independently of each other: a pretreatment system, a reaction system, and a purification system.

Referring now to FIG. 1, a representative, non-limiting embodiment will now be described. As shown in FIG. 1A, the system (1) comprises a pretreatment system comprising a pretreatment reactor (10) for receiving a mixture of feedstock (2) comprising fatty acid alkyl esters and one or more additional components, such as caustic (3) (e.g., sodium hydroxide or potassium hydroxide) for neutralizing the feedstock (5) and acid (4) to aid in removing gums (lecithins) and including any impurities that can damage or shorten the life of the catalyst. The pretreatment system further comprises a clarifier (20) or other mechanical device in fluid communication with the pretreatment reactor (10) for separating suspended solids and gums from the mixture. The system further provides a separator (30), e.g, a centrifuge, in fluid communication with the clarifier (20) to separate and remove wash water (40) from the clarified mixture. The clarified and dewatered mixture can then be dried using a dryer (50), such as a vacuum dryer. The dried mixture is filtered (60) to remove metals. In some embodiments, the filter comprises silica (61) and diatomaceous earth. The filtered feedstock stream (70) comprising the fatty acid alkyl esters (e.g., oil) is then sent to the Reaction Process subsystem.

Figure 1B:
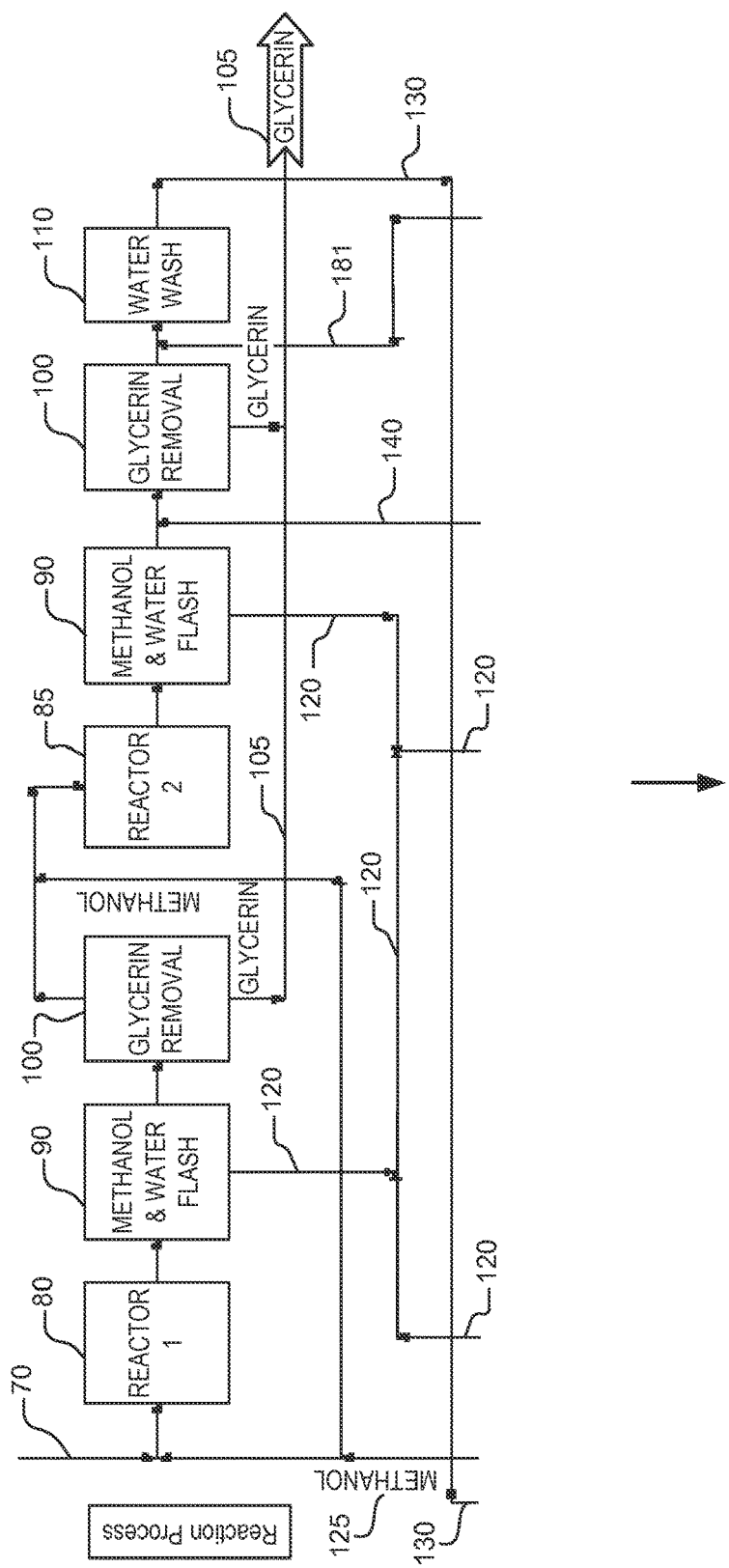

Referring now to FIG. 1B, the feedstock stream (70) is combined with a methanol stream (125) under elevated temperature and pressure, and fed into a first reactor (80) containing a catalyst described herein. The reactor (80) is configured to operate in an upflow mode. The reactants (fatty acid alkyl esters and methanol) contact the active sites on the catalyst surface and are converted to alkyl esters. The effluent from the first reactor (80) undergoes gas/liquid separation to separate the primary reaction products from unreacted methanol in a flash separator (90), producing a recovered methanol stream (120) and a stream comprising an oil phase and a glycerin phase. This stream is sent to a separator (100) for separating the oil phase from the glycerin phase. The glycerin stream (105) can be sent to a glycerin finishing system (not shown) for purifying the glycerin by removing methanol and water present in the stream (105). The methanol is typically recovered and recycled in the system. The oil phase from separator (100) is mixed with methanol under pressure and added to the second reactor (85) containing a catalyst described herein. The above steps are repeated in separators (90) and (100). After glycerin removal, the oil is washed with water in the water wash column (110) to remove residual methanol, glycerin, and side reaction products from the fatty acid alkyl esters (oil) stream (130). In some embodiments, the water wash column (110) is a multi-stage stirred contactor, and water is introduced in counter-current flow to the oil. Stream (130) is then sent to the distillation system.

Figure 1C:
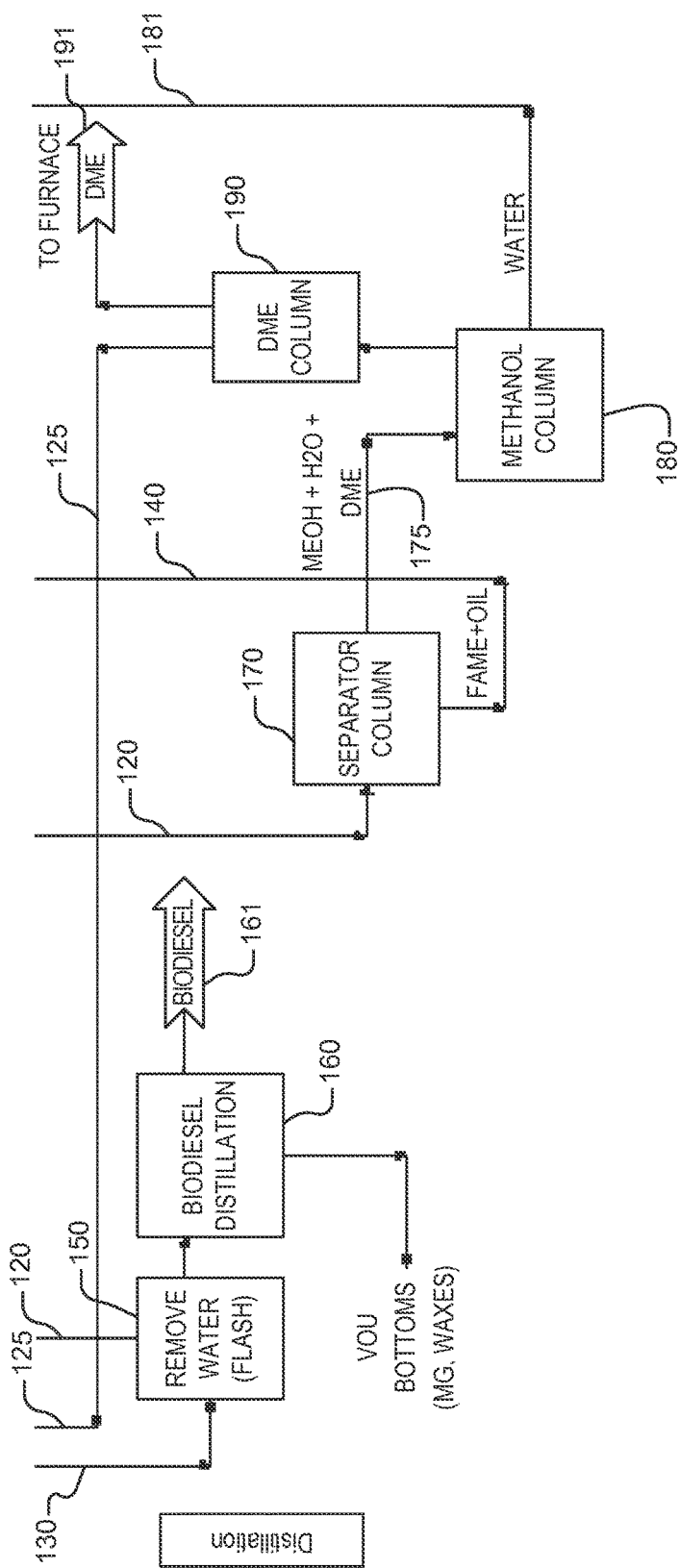

Referring now to FIG. 1C, the washed oil stream (130) is sent to separator (150) to remove excess water. The dewatered fatty acid alkyl ester stream is further purified using a distillation column (160) to produce commercial grade product. The bottoms residue from the column typically contains higher boiling point glycerides that can be recovered for recycle or sold as a co-product. The distillate comprises the purified biodiesel product (161). The methanol streams (120) from the upstream process are separated in a separator column (170) to separate any residual fatty acid alkyl esters/oil from the methanol, water, and DME. The oil stream (140) can be recycled to the glycerin removal separator (100) to recover more oil. The methanol stream is sent to methanol dehydration column (180) to remove water and DME from the methanol recycle stream. The water stream (181) can be recycled as needed to upstream process steps, for example the water wash column (110). The methanol is separated from the DME in column (190), producing a DME stream (191) that can be recycled in the system, and can be used as a heating fuel. The dehydrated methanol stream (125) is recycled in the system, for example, by combining stream (125) with the oil stream (70) before adding the mixture to the reactors.

In some embodiments, a system for making a fatty acid alkyl ester is described, the system comprising: at least two reactors for reacting a) an alcohol and b) a mixture of a fatty acid glyceride and a fatty acid; and a heterogeneous catalyst; each reactor being capable of i) receiving a controlled flow of the alcohol and the mixture, ii) controlling the temperature or pressure within the reactor; and iii) removing one or more components of the reaction mixture.

In some embodiments, the system further comprises a separating apparatus, comprising a means to remove less dense components from the upper portion of the separator and a means to remove more dense components from the bottom portion of the separator. In some embodiments, said means to remove less dense components from the upper portion of the separator comprises a condenser; and a means to control the temperature of the condenser.

EXAMPLES

Non-limiting examples are described herein.

Example 1

This example describes one embodiment for producing fatty acid alkyl esters from a feedstock comprising fatty acid glycerides described herein.

A feedstock comprising fatty acid glycerides was pretreated as follows. The pH of the feedstock was adjusted to about 6.5 using caustic (0.03% by weight). The feedstock was degummed by treating the feedstock with phosphoric acid. The degummed and neutralized feedstock was heated to 185 degrees F., and sent to a clarifier centrifuge to remove water and insolubles. The clarifier reduced the amount of water by about 77% and the amount of insolubles by about 95%. The clarified feedstock was washed with water (2% by weight of the feedstock) at a temperature of 185 degrees F. for 15 min. The excess water, dissolved insolubles, and other components were separated from the feedstock using a centrifuge, which reduced the water content by about 89% and the insolubles by about 98%. The washed feedstock was then dried at 185 degrees F. and 2 psia to remove additional water. The dried feedstock was then filtered through diatomaceous earth and silica (0.3% by weight) with a retention time of 20 min. The combination of water wash and filtration removed about 48% of the calcium, about 59% of the magnesium, about 76% of the sodium, and about 77% of the potassium present in the feedstock. In addition, about 25% of the sulfur was removed.

Following the pretreatment steps, pressurized oil and methanol streams were combined in a static mixer that disperses methanol into the oil. The mixed reactant stream was directed to the reactor preheater where it was heated to reaction temperature (400 degrees F. for the first reactor, 349 degrees F. for the second reactor).

The heated and mixed feed flow into the bottoms of two fixed bed reactors placed in series containing the heterogeneous catalyst. The catalyst eliminates the typical base-catalyzed, (by sodium hydroxide, potassium hydroxide, or sodium methoxide) transesterification reaction. The reactors were configured to operate in an upflow (flooded) mode such that the reactants are in the liquid phase. The flow through the reactors was 0.4 to 0.6/hr WHSV. The pressure in the reactors was between 760 and 777 psia. The methanol to oil molar ratio was 14.5:1 in the first reactor, and 80.7:1 in the second reactor. Reactants (oil and methanol) were converted to methyl esters in the reactors. The reactors were insulated and operated in a near-adiabatic mode with no external or internal heat transfer devices.

The catalyst used in the reactors was BeneFuel® Ensel® 1249 catalyst. Inert ceramic catalyst supports were used above and below the catalyst bed for catalyst retention and to ensure good flow distribution. Engineered, wedge-wire lateral distributors were used to feed reactants to the reactor.

The conversion of oil in the reactor was the range of 85-95% in the first reactor, and was about 99% of total triglycerides (TGs) in the second reactor. Essentially all fatty acids entering the reactor were also converted to FAME and water.

The effluent of each reactor was subjected to gas/liquid separation and FAME/glycerin separation.

Reactor Gas/Liquid Separation

The gas/liquid separation system separates the primary reactor products from the bulk of the unreacted methanol. The products exiting the reactors were sent to separate flash separators. The vapors exited the separators through pressure control valves and were directed to the methanol dehydration column.

Crude FAME—Glycerin Separation

The FAME/glycerin separation system separates the FAME/oil phase from the glycerin phase. The liquids from the reactor flash separators contain unconverted and partially converted oil, FAME, glycerin, and small amounts of methanol, water and ethers. The reaction mixture was cooled and entered the FAME/glycerin separators as two distinct phases, FAME/oil and glycerin. The lighter oil layer contained primarily FAME, unreacted glycerides and lipophilic unsaponifiables. The heavier glycerin layer contained primarily water, methanol, side reaction products, polar unsaponifiables and metal salts.

Methanol Dehydration

The methanol dehydration column removes water and dimethyl ether (DME), a side reaction product, from the methanol recycle stream. The system is designed to minimize water and DME in the methanol recycle. An additional tower, the DME tower, will recover methanol from the DME stream that would otherwise be lost from the process and burned as fuel. The DME stream will be recycled within the process by combining it with natural gas and used for process heat.

FAME Water Wash Column

The FAME water wash column removes residual methanol, glycerin, and side reaction products from the FAME stream. The column is a multiple-stage stirred contactor. Water was introduced at the top and FAME at the bottom, such that the liquids flowed in counter-current directions through the tower. The water was routed to the glycerin column.

FAME Vacuum Distillation Column

The FAME product stream leaving the FAME water wash column was further purified prior in order to attain commercial grade quality. At this point in the process, the FAME product stream contains several mono-, di-, and tri-glycerides, as inherent impurities, and high boiling unsaponifiable organics. These impurities were removed by distillation. The column is designed to work under vacuum, nominally at a pressure of about 0.1 psia. The bottoms residue containing the higher boiling glycerides can be recovered for recycle or sold as a co-product. The distillate contained the purified FAME product. The above processing step results in a biodiesel product that meets ASTM D6751, including the cold soak filterability test, which effectively mandates very low levels of FFAs and partially converted triglycerides.

Glycerin Column

The glycerin contains primarily water, side reaction products, and methanol as impurities, and may also contain metal salts. The glycerin column removes the methanol and water, which were routed to the methanol distillation column. The crude glycerin can be routed to product tankage.

Co-Products

The process produced the following coproducts having the indicated estimated value and suitable for the indicated end uses.

| Co-Product | Estimated Value ($/lb) | Potential End-Use |
| --- | --- | --- |
| Wet Gums | 0.01-0.05 | Animal Feed |
| Crude Glycerin | 0.05-0.20 | Animal Feed, Oleo chemicals |
| VDU Bottoms | 0.01-0.05 | Bunker fuel or for use in asphalt |

Example 2

This example describes one embodiment for pretreating a feedstock comprising fatty acid glycerides.

A sample of corn oil was neutralized with caustic. The sample was clarified and washed with 5% water for 10 minutes at 175 deg F., then treated with 1% silica at 175 deg F. for 30 min and filtered. Insolubles were reduced from >0.09 to 0.03%. Metals were reduced as follows: calcium, from 7.5 to 1 ppm; magnesium, from 10 to 1 ppm; potassium, from 40 to 1 ppm; phosphorus, from 2 to 1.1 ppm, sulfur, from 10 to 6.1 ppm. Sodium was not reduced.

Example 3

This example describes one embodiment of using a water wash to remove methanol, glycerin, and MPD from a FAME product.

In one experiment, a stream of FAME produced from corn oil and having concentrations of methanol, glycerin, and MPD of 3538, 300, and 5981 ppm by weight, is contacted with water. The water and FAME liquids contact one another in a multistage, countercurrent, stirred tank vessel. The stirred tank vessel configuration is that of a Schiebel® column. The column was operated at a temperature of 140 deg F. FAME is introduced at the bottom of the column, and water is introduced at the top. The ratio of water to FAME is 5 gallons of water to 100 gallons of FAME. The washed FAME had a methanol concentration of 120 ppm, and glycerin and MPD were not detected.

In another experiment, a stream of FAME produced from beef tallow and having concentrations of methanol, glycerin, and MPD of 4800, 220, and 5110 ppm by weight, is contacted with water. The water and FAME liquids contact one another in a multistage, countercurrent, stirred tank vessel. The stirred tank vessel configuration is that of a Schiebel® column. The column was operated at a temperature of 140 deg F. FAME is introduced at the bottom of the column, and water is introduced at the top. The ratio of water to FAME is 3 gallons of water to 100 gallons of FAME. The washed FAME had a methanol concentration of 106 ppm, a glycerin concentration of 20 ppm, and MPD was not detected.

In another example, a stream of FAME produced from corn oil and having concentrations of methanol, glycerin, and MPD of about 1877, 764, and 3740 ppm by weight, will be contacted with water. The water and FAME liquids will contact one another in a multistage, countercurrent, stirred tank vessel. The stirred tank vessel configuration will be that of a Schiebel® column. The column will be operated at a temperature of 140 deg F. FAME will be introduced at the bottom of the column, and water will be introduced at the top. The ratio of water to FAME will be 3.6 gallons of water to 100 gallons of FAME. The washed FAME will have a methanol concentration of 459 ppm, a glycerin concentration of 17 ppm, and MPD will not be detected.

Example 4

This example describes one embodiment for removing DME from a methanol stream.

A vapor stream from the methanol dehydration column, after 92% of the methanol will have been condensed for recycle to the column as reflux or for recycle to the reactors, and which will comprise 99% methanol and 1% DME will be routed to a separation column. The column will operate at an average temperature of 156 deg F. and a pressure of 17.5 psia. The column will distill DME out of the methanol, recovering 99.5% of the methanol from the column bottom for recycle to the reactors. The column overhead will be 75% DME and 25% methanol, to be used as fuel for process heating needs.

Example 5

This example describes one embodiment of a batch process.

Palm oil (2.99 kg) and methanol (1.61 kg) were charged to a 20 L stainless steel vessel. To this was added, with stirring, 0.15 kg of double metal cyanide powdered catalyst (5% by wt.). The vessel was sealed and temperature increased to 170.degree. C. with agitation and held with agitation for eight (8) hrs. Upon cooling and filtration, a total of 4.451 kg of material was recovered. Following the distillation of excess methanol, the fatty acid methyl ester (FAME) and glycerin layers were separated, affording 0.316 kg of glycerin (99.5% by wt) and 4.135 kg FAME (99.5% by wt).

Example 6

This example describes another embodiment of a batch process.

A batch reaction for producing fatty acid methyl esters (bio-diesel) from soybean oil and methanol was conducted in a "Teflon-lined" steel autoclave (100 ml) and using a rotating hydrothermal reactor (Hiro Co., Japan; Mode-KH 02). The rotation speed was 50 rpm. A soybean oil (33 grams), methanol and "finely powdered" solid alumina catalyst (5 wt % based on grams of soybean oil, containing 14.9% by weight molybdenum trioxide and 2% by weight phosphorus) were sealed in a reactor and heated at 190 degrees C. for 8 hours. The alcohol to oil molar ratio was 15:1. The autoclave was cooled to room temperature. The catalyst was separated by centrifugation followed by simple decantation. The entire liquid was subjected to vacuum distillation and excess, unused alcohol was removed. Glycerol settled at the bottom as a separate layer. Fatty acid methyl esters and un-reacted oil, if any, floated above the glycerol portion. Petroleum ether (20 to 50 ml) was then added. The esters and oil readily went into the petroleum ether layer. Glycerol remained as a separate layer. It was separated and its yield was determined and purity checked by $^1$H nuclear magnetic resonance (Bruker 200 MHz Avance NMR spectrometer). The conversion to fatty acid methyl ester was 100%. The fatty acid alkyl ester portion contained 95.6% fatty acid methyl ester, 0% triglyceride, 0.5% diglyceride, and 4.0% monoglyceride as determined by high performance liquid chromatography (HPLC).

Example 7

This example describes one embodiment of a continuous flow process.

The fatty acid glycerides feedstock will be pretreated as described in Example 1 to remove impurities and contaminants. In two fixed bed reactors placed in series (D×ID=3"× 24") a bed of a alumina supported catalyst (1,341 g) containing 14.9% by weight molybdenum oxide ($MoO_3$), 2% by weight phosphorus (P), and inert alumina balls (540 g, Denstone®. D99, Norpro, Saint Gobain, Ohio, U.S.A.) in a 2.5:1 ratio in the form of extrudates will be placed in a stainless steel reactor having a provision of auto-controlled temperature and feed-flow facilities. As methanol and fatty acid glyceride feedstock are immiscible, a duel pumping system will be utilized and the feedstock will be sent in an upward-flow at a WHSV of 0.7. The mass ratio of methanol to fatty acid glyceride feedstock will be maintained at 0.54. The operating temperature of the reactor will be maintained at 216 degrees C. and the pressure of 45 bar. The reaction conditions and mass ratio were maintained over a period of 10 days. The product will be collected at the top of each reactor. The entire liquid will be subjected to vacuum distillation and excess, unused alcohol will be removed. The crude product will be separated from the glycerin in a separatory funnel. The crude product will be distilled in a glass wiped film evaporator to afford water white fatty acid methyl ester with a low total fatty acid glycerides value.

Example 8

This example describes another embodiment of a continuous flow process.

The production of fatty acid octyl ester (biolubricants) by esterification of a crude fatty acid methyl ester derived from soybean oil with octanol is described herein. The reaction will be conducted in a similar manner as described in Example 3, except that two reactors in series will be used. Over a period of 2 days soy oil will be contacted with a alumina supported catalyst containing 14.12% by weight $MoO_3$, 1% by weight P, and 1% by weight CaO in the presence of methanol at a space velocity of 0.68/hr, temperature of 211 degrees C., pressure of 44 bar and a mass ratio of 0.53 of methanol to soy oil to produce a crude product containing fatty acid methyl ether and glycerin.

Example 9

This example describes another embodiment of a continuous flow process.

An alumina supported catalyst (21.4 g) containing 14.9% by weight $MoO_3$, and 2.0% by weight P will be positioned in two stainless steel fixed bed reactors. The crude soy methyl ester mixture described in Example 4 and an excess of 1-octanol (molar ratio of crude soy methyl ester to octanol of 1:9) will be contacted with the molybdenum catalyst at space velocities between of 0.4/hr and 0.75/hr temperature of 200 degrees C., and a pressure of 1 atm. The amount of fatty acid methyl ester converted to the octyl ester will be analyzed by HPLC. Methanol and the octyl esters will then be recovered by distillation.

Example 10

This example describes another embodiment of a continuous flow process.

An alumina supported catalyst (11.4 g) containing 14.9% by weight $MoO_3$, and 2.0% by weight P will be positioned in two stainless steel fixed bed reactors arranged in series. Crude sunflower methyl ester mixture will be contacted with the catalyst in the presence of 2-ethyl-1-hexanol or 1-octanol at space velocity of 0.4/hr and 1 atm to produce the corresponding fatty acid alkyl esters.

Example 11

This example describes another embodiment of a continuous flow process.

Two tubular reactors arranged in series with five sagitally positioned thermowells will be equipped with thermocouples to measure temperatures throughout the length of catalyst bed. Mass flow meters will be installed in-line to measure mass flow rates into the reactors for both feedstock and methanol and from the reactor and to adjust the mass ratios to control the process. The catalyst bed will be formed by filling the space (0.304 m ID times 2.134 m L) with 90.7 kg catalyst and a layer of alumina inerts above (5.71 kg) and below (5.71 kg) the catalyst bed, the alumina balls serving as a support for the catalyst bed and space filling to reduce reactor void volume and to increase reagent and effluent flow rates through the reactors. These inert alumina balls have no catalytic properties under the process conditions described herein.

The feedstock will be pretreated as described in Example 1, and pumped into the reactors from the bottom of the reactor to the top of the reactor (upflow mode). The catalyst will include about 15% by weight $MoO_3$, 3% by weight P, and 1% by weight CaO supported on alumina. The catalyst will be prepared as described herein and in U.S. Pat. No. 8,124,801 to Srinivas et al., which is incorporated by reference herein.

The catalyst will be activated by introducing a heated stream of dry nitrogen gas into the contacting zones at a space velocity of 500/hr (SV=vol N.sub.2/hr divided by vol of catalyst) at atmospheric pressure. The temperature will be increased from ambient temperature to 200 degrees C. in the contacting zone (catalyst bed) at a rate of 50 degrees C./hr and then held at 200 degrees C. for 6 hrs. Following this holding period, the temperature will be raised again to 25 degrees C. at a rate of 50 degrees C./hr and then held there for an additional 4 hrs. At the conclusion of this last holding period the flow rate of nitrogen will be reduced to a space velocity of 5/hr and the catalyst bed permitted to cool to the start-up temperature of 150 degree C.

The crude feedstock and the methanol (methanol, 99.95% purity) will be pumped through an in-line static mixer and inline heater into the reactor.

The reactor pre-heater will raise the temperature of the reagents to within 10 degrees C. of the preferred reactor temperature. The reagent mixture will flow upwards through the contacting zone and out of the top of the reactors.

Normal contacting conditions will be as follows: WHSV of 0.4 $h^{-1}$ (WHSV=0.4/hr, where WHSV=wt of oil/hr divided by wt of catalyst), an average temperature across the contacting zone of between 200-210 degrees C., pressure of 46-55 bar and a molar ratio of methanol to feedstock in the range of 12:1 to 15:1. These operating conditions will be controlled by a programmed logic system, which is designed to hold these parameters within a range of +/−3% of set point.

A total of 957.6 kg of feedstock will be processed over a 24 hr period at the WHSV of 0.45/hr, average catalyst bed temperature of 210 degrees C., pressure of 47 bar and a molar ratio of 12:1. Upon exiting the reactors, the reactor pressure will be reduced through a back pressure valve to 1-2 bar and the methanol, which will be flash evaporated, recovered for recycle. The total raw/crude product will be analyzed periodically after the methanol flash and conversion of corn oil into fatty acid methyl esters determined by gas chromatography analysis using ASTM method D6584.

Total product exiting the reactor (that is, crude product consisting of fatty acid methyl esters and some unreacted glycerides, water, methanol and glycerin) will be passed through a high-pressure separator. In the high-pressure separator, a vacuum of 250-350 mm Hg will be applied at 100 degree C. to evaporate a significant portion of the methanol and water from the total product (95+% of methanol). The methanol and water vapor mixture will be condensed elsewhere and stored for later refinement of the methanol.

The crude fatty acid alkyl ester/glycerin stream will be introduced into an electrostatically enhanced gravity separator. In the electrostatic separator, the glycerin stream and the crude fatty acid methyl ester stream will be separated continuously. Each separated phase will be pumped to respective holding tanks. Separating conditions in the electrostatic precipitator will be nominally: input voltage: 480 V, single phase, at 10.4 amp, secondary voltage: 23 kV, single phase at 217 amp, tertiary voltage: 100 V at 2 amp.

The crude fatty acid alkyl ester stream will be purified using a short-path distillation system operating at between 24-30 mmHg with a jacket temperature of 200 degrees C. to yield a clear, colorless, bright liquid. The distilled product will be routinely analyzed by GC, HPLC and NIR to determine the purity of the distilled product and specification grade relative to ASTM standards.

The glycerin recovered from the electrostatic separator will be assayed to determine the amount of impurities. Methods for glycerin refinement are known in the art. Other embodiments of this general process may include vacuum distillation of the glycerin to achieve higher commercial grades.

Methanol recovered from the Flash apparatus can be recycled through a distillation system with column employing a structured packing, a variable reflux ratio and a forced reboiler. The methanol recycle in this fashion is expected to afford 99.5% recovery of unreacted methanol at a purity of 99.9% methanol and 0.1% water.

Embodiments of the present disclosure further relate to any one or more of the following paragraphs:

1. A process for making a fatty acid alkyl ester from a mixture comprising a fatty acid glyceride; a fatty acid and at least one component selected from the group consisting of a gum, a suspended solid, a dissolved metal, and combinations thereof, comprising:
   a) purifying the mixture by:
      i) contacting the mixture with water;
      ii) separating the mixture to reduce the amount of at least one component from the mixture while the amount of fatty acid relative to the amount of fatty acid glyceride in the mixture is substantially the same; and
      iii) drying the mixture; and
   b) contacting the purified mixture from step a) with an alcohol and at least one catalyst in a reactor to obtain a fatty acid alkyl ester.

2. A process for making a fatty acid alkyl ester from a mixture comprising a fatty acid glyceride; the process comprising
   a) contacting the mixture with an alcohol and a heterogeneous acid catalyst in a first reactor to produce a first reaction mixture;
   b) transferring the first reaction mixture to a second reactor,
   c) contacting the first reaction mixture with additional alcohol and a heterogeneous acid catalyst to produce a second reaction mixture comprising a fatty acid alkyl ester, unreacted alcohol, and glycerin; wherein the acid number of the second reaction mixture is less than about 0.5, 0.4, 0.3, 0.2, or 0.1.

3. A process for making a fatty acid alkyl ester from a mixture comprising a fatty acid glyceride; the process comprising
   c) contacting the mixture with an alcohol and a heterogeneous acid catalyst to produce a reaction mixture comprising a fatty acid alkyl ester, unreacted alcohol, glycerin, dimethyl ether (DME), and water; and
   d) reducing the amount of DME from the reaction mixture while maintaining the amount of fatty acid ester; to obtain a fatty acid alkyl ester.

4. The process of paragraph 3, whereby step b) further comprises:
   i) separating the glycerin from the reaction mixture; and
   ii) removing the alcohol, water and DME from the mixture of step i; to obtain a fatty acid alkyl ester.

5. The process according to any one of paragraphs 3 and 4 wherein the DME is concentrated and used as a fuel.

6. A process for making a fatty acid alkyl ester from a mixture comprising a fatty acid glyceride; the process comprising
   a) contacting the mixture with an alcohol and a heterogeneous acid catalyst to produce a reaction mixture comprising a fatty acid alkyl ester, unreacted alcohol, glycerin, methoxypropanediol (MPD) and water; and
   b) reducing the amount of MPD from the mixture while maintaining the amount of fatty acid ester; to obtain a fatty acid alkyl ester.

7. The process of paragraph 6, whereby step b) further comprises:
   i) separating glycerin and MPD from the reaction mixture;
   ii) washing the reaction mixture from step i with water; to obtain a fatty acid alkyl ester.

8. The process of paragraph 1, wherein the purified mixture contains less than about 50% by weight of the at least one component when the purified mixture contacts the catalyst based on the total weight of the purified mixture.

9. The process of paragraph 1, wherein the purified mixture contains less than about 10 ppm of the at least one component when the purified mixture contacts the catalyst based on the total weight of the purified mixture.

10. The process of paragraph 2, wherein the mol. % conversion to fatty acid alkyl ester made is greater than the mol. % conversion made using two reactors in parallel under substantially identical reaction conditions.

11. The process of paragraph 2, wherein the mol % conversion of fatty acid glyceride to fatty acid alkyl ester obtained is at least about 95 mol % based on the isolated glycerin yield.

12. The process according to paragraphs 1 or 2, wherein the temperature and pressure in the reactor is controlled and the contacting step occurs under conditions of elevated temperature and pressure.

13. The process according to paragraphs 1 or 2, wherein the temperature in the reactor is in the range of less than 200° C. and a pressure of less than about 0.65 MPa for a period of about 2 to about 6 hours.

14. The process according to any of the preceding paragraphs, wherein the pressure and temperature of the reaction mixture is decreased to separate a substantial amount of the alcohol from the reaction mixture while the amount of the fatty acid alkyl ester is substantially the same.

15. The process according to any of the preceding paragraphs, further comprising allowing the glycerin to separate from the rest of the reaction mixture.

16. The process according to any of the preceding paragraphs, further comprising applying an electrostatic field to separate the fatty acid alkyl ester from the glycerin.

17. The process according to any of the preceding paragraphs, wherein the source of fatty acid glyceride used is a vegetable oil, an animal fat, a cooking oil or grease, or a waste cooking oil or grease 18. The process according to paragraph 17, wherein the vegetable oil used is selected from the group consisting of coconut oil, palm oil, sunflower oil, soybean oil, mustard oil, olive oil, cotton seed oil, rapeseed oil, margarine oil, jojoba oil, jatropha oil, karanj a oil, camellia, pennycress, meadowfoam, and mixtures thereof.

19. The process of paragraph 1, wherein the component is a gum selected from the group consisting of a phospholipid, a hydratable or non-hydratable phosphatide, and a lecithin.

20. The paragraph of paragraph 1, wherein the component is a suspended solid selected from the group consisting of a wax and cellulose.

21. The paragraph of paragraph 1, wherein the component is a metal selected from the group consisting of sodium, potassium, phosphorous, magnesium, and calcium 22. The process according to any one of paragraphs 1-4, wherein the alcohol has a carbon number ranging from 1 to 50.

23. The process according to any of the preceding paragraphs, wherein the alcohol is selected from the group consisting of methanol, ethanol, propanol, butanol, pentanol, octanol, 2-ethylhexanol, decanol, dodecanol, polyols, and mixtures thereof.

24. The process according to any of the preceding paragraphs, wherein the alcohol is methanol.

25. The process according to any of the preceding paragraphs, wherein catalyst comprises a metal ion on a support wherein the metal ion is selected from the group consisting of molybdenum (Mo), iron (Fe), cobalt (Co) and chromium (Cr).

26. The process according to any of the preceding paragraphs, wherein the catalyst is reusable by recycling without significant loss in activity.

27. The process according to any of the preceding paragraphs, wherein catalyst is a heterogeneous acid catalyst.

28. The process according to according to any of the preceding paragraphs, wherein the concentration of catalyst used is 1-2 wt. % based on the weight of the fatty acid glyceride 29. The process according to any of the preceding paragraphs, further comprising: controlling a flow rate of the mixture of fatty acid glycerides to the reactor, controlling a flow rate of the alcohol to the reactor, or controlling the flow rate of the reaction mixture from the reactor.

30. The process according to any of the preceding paragraphs, further comprising analysing the concentration of fatty acid glyceride, alcohol, fatty acid alkyl ester, or glycerin from the reaction mixture; and adjusting the reaction conditions based on at least one of the assessed concentrations.

31. The process according to any of the preceding paragraphs, wherein the flow rate of the mixture of fatty acid glycerides to the reactor and the flow rate of the alcohol to the reactor is controlled such that the molar ratio of fatty acid glyceride to alcohol used is in the range of 1:6 to 1:50.

32. The process according to any of the preceding paragraphs, wherein the fatty acid alkyl esters stream comprises alkyl esters of fatty acids selected from myristic, palmitic, palmitoleic, stearic, oleic, linoleic, linolenic, alpha-linolenic acid (ALA), gamma-linolenic acid (GLA), and arachidic acids and their mixtures thereof.

33. The process according to according to any of the preceding paragraphs, wherein the process is continuous.

34. The process according to any of the preceding paragraphs, wherein the alcohol is recovered and recycled.

35. A product made by the process according to any of the preceding paragraphs.

36. The use of a product of paragraph 35 as a fuel.

37. A system for making a fatty acid alkyl ester, comprising: at least two reactors for reacting a) an alcohol and b) a mixture of a fatty acid glyceride and a fatty acid; and a heterogeneous acid catalyst; each reactor being capable of i) receiving a controlled flow of the alcohol and the mixture, ii) controlling the temperature or pressure within the reactor; and iii) removing one or more components of the reaction mixture.

38. The system of paragraph 37, wherein further comprising a separating apparatus, comprising a means to remove less dense components from the upper portion of the separator and a means to remove more dense components from the bottom portion of the separator.

39. The system of paragraph 38, wherein said means to remove less dense components from the upper portion of the separator comprises a condensor; and a means to control the temperature of the condenser.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A process for making a fatty acid alkyl ester from a mixture comprising a fatty acid glyceride; a fatty acid and at least one component selected from the group consisting of a gum, a suspended solid, a dissolved metal, and combinations thereof, comprising:
    a) purifying the mixture by:
        i) contacting the mixture with water;
        ii) separating the mixture to reduce the amount of at least one component from the mixture while the amount of fatty acid relative to the amount of fatty acid glyceride in the mixture is substantially the same; and
        iii) drying the mixture; and
    b) contacting the purified mixture from step a) with an alcohol and a supported heterogeneous acid catalyst in a first fixed bed reactor and performing esterification of fatty acids and transesterification of fatty acid glycerides to produce a first reaction mixture comprising a fatty acid alkyl ester, wherein said heterogeneous acid catalyst comprises one or more metals selected from the group consisting of molybdenum (Mo), iron (Fe), cobalt (Co) and chromium (Cr);
    c) transferring at least a portion of the first reaction mixture to a second fixed bed reactor,
    d) contacting the transferred portion of the first reaction mixture with additional alcohol and said heterogeneous acid catalyst and performing esterification of fatty acids and transesterification of fatty acid glycerides to produce a second reaction mixture comprising a fatty acid alkyl ester, unreacted alcohol, and glycerin; wherein the acid number of the second reaction mixture is less than about 0.5, 0.4, 0.3, 0.2, or 0.1.

2. The process of claim 1, wherein the second reaction mixture further comprises dimethyl ether (DME) or methoxypropanediol (MPD), and water; and the process further comprises
    e) reducing the amount of DME or MPD from the reaction mixture while maintaining the amount of fatty acid ester; to obtain a fatty acid alkyl ester.

3. The process of claim 2, whereby step e) further comprises:
    i) separating the glycerin from the reaction mixture; and ii) removing the alcohol, water and DME from the mixture of step i to obtain a fatty acid alkyl ester; or
iii) separating glycerin and MPD from the reaction mixture; and
iv) washing the reaction mixture from step iii with water to obtain a fatty acid alkyl ester.

4. The process of claim 1, wherein the purified mixture contains less than about 10 ppm of the at least one component when the purified mixture contacts the heterogeneous acid catalyst based on the total weight of the purified mixture.

5. The process of claim 1, wherein the mol. % conversion to fatty acid alkyl ester made is greater than the mol. % conversion made using two reactors in parallel under substantially identical reaction conditions.

6. The process of claim 1, wherein the mol % conversion of fatty acid glyceride to fatty acid alkyl ester obtained is at least about 95 mol % based on the isolated glycerin yield.

7. The process of claim 1, wherein the temperature and pressure in the reactor is controlled and the contacting step occurs under conditions of elevated temperature and pressure.

8. The process of claim 1, wherein temperature in the reactor is in the range of less than 200° C. and a pressure of less than about 0.65 MPa for a period of about 2 to about 6 hours.

9. The process of claim 1, wherein the pressure and temperature of the reaction mixture is decreased to separate a substantial amount of the alcohol from the reaction mixture while the amount of the fatty acid alkyl ester is substantially the same.

10. The process of claim 1, further comprising allowing the glycerin to separate from the rest of the reaction mixture; or further comprising applying an electrostatic field to separate the fatty acid alkyl ester from the glycerin.

11. The process of claim 1, wherein the source of fatty acid glyceride used is a vegetable oil, an animal fat, a cooking oil or grease, or a waste cooking oil or grease.

12. The process of claim 1, wherein the component is (i) a gum selected from the group consisting of a phospholipid, a hydratable or non-hydratable phosphatide, and a lecithin;
(ii) a suspended solid selected from the group consisting of a wax and cellulose; or
(iii) a metal selected from the group consisting of sodium, potassium, phosphorous, magnesium, and calcium.

13. The process of claim 1, wherein the alcohol is selected from the group consisting of methanol, ethanol, propanol, butanol, pentanol, octanol, 2-ethylhexanol, decanol, dodecanol, polyols, and mixtures thereof.

14. The process of claim 1, wherein said heterogeneous acid catalyst comprises a metal ion on a support wherein the metal ion is selected from the group consisting of molybdenum (Mo), cobalt (Co) and chromium (Cr).

15. The process of claim 1, wherein the concentration of the heterogeneous acid catalyst used is 1-2 wt. % based on the weight of the fatty acid glyceride.

16. The process of claim 1, further comprising: controlling a flow rate of the mixture of fatty acid glycerides to the reactor, controlling a flow rate of the alcohol to the reactor, or controlling the flow rate of the reaction mixture from the reactor.

17. The process claim 1, wherein the flow rate of the mixture of fatty acid glycerides to the reactor and the flow rate of the alcohol to the reactor is controlled such that the molar ratio of fatty acid glyceride to alcohol used is in the range of 1:6 to 1:50.

18. The process of claim 1, wherein the fatty acid alkyl esters stream comprises alkyl esters of fatty acids selected from myristic, palm itic, palm itoleic, stearic, oleic, linoleic, linolenic, alpha-linolenic acid (ALA), gamma-linolenic acid (GLA), and arachidic acids and their mixtures thereof.

19. The process of claim 1, wherein temperature in the first and second reactors is in the range of 165 to 260° C.

* * * * *